United States Patent [19]
Terada et al.

[11] Patent Number: 5,396,389
[45] Date of Patent: Mar. 7, 1995

[54] THIN-FILM MAGNETIC CIRCUIT BOARD AND MAGNETIC HEAD USING THE SAME

[75] Inventors: Nobuhiro Terada, Kasugai; Soichiro Matsuzawa, Kuwana, both of Japan

[73] Assignee: NGK Insulators, Ltd., Japan

[21] Appl. No.: 885,447

[22] Filed: May 20, 1992

[30] Foreign Application Priority Data

May 21, 1991 [JP] Japan ............................ 3-146918

[51] Int. Cl.⁶ .................... G11B 5/17; G11B 5/147
[52] U.S. Cl. ................................ 360/123; 360/126
[58] Field of Search ............ 360/126, 123, 113, 110, 360/121

[56] References Cited

U.S. PATENT DOCUMENTS

| | | | |
|---|---|---|---|
| 4,626,947 | 12/1986 | Narishige et al. | 360/126 |
| 4,719,527 | 1/1988 | Yoshisato et al. | 360/126 |
| 4,797,765 | 1/1989 | Ezaki et al. | 360/126 |
| 4,943,883 | 7/1990 | Sano et al. | 360/126 |
| 5,031,063 | 7/1991 | Hasegawa | 360/126 |
| 5,136,447 | 8/1992 | Makino et al. | 360/126 |
| 5,157,570 | 10/1992 | Shukovsky et al. | 360/126 |

FOREIGN PATENT DOCUMENTS

| | | | |
|---|---|---|---|
| 56-145517 | 11/1981 | Japan | 360/126 |
| 57-20912 | 2/1982 | Japan | 360/126 |
| JA97119 | 6/1983 | Japan | 360/113 |
| JA171018 | 9/1984 | Japan | 360/126 |
| 3225610 | 10/1991 | Japan | 360/126 |

OTHER PUBLICATIONS

IBM Technical Disclosure Bulletin (vol. 23, No. 10, Mar. 1981).

*Primary Examiner*—Stuart S. Levy
*Assistant Examiner*—Allen Cao
*Attorney, Agent, or Firm*—Parkhurst, Wendel & Rossi

[57] ABSTRACT

A thin-film magnetic circuit board is disclosed which includes: a substrate formed of a non-magnetic material; a connector formed from a magnetic film on one major surface of the substrate, the connector having opposite end portions which protrude from the substrate to form a pair of protrusions; at least one coil formed from an electrically conductive film to provide a circuit pattern on the one major surface of the substrate, each coil having a spiral shape and surrounding a corresponding one of at least one of the protrusions of the connector; and a pair of leads which are electrically connected to opposite ends of the circuit pattern formed by the coil(s). Also is disclosed a magnetic head including this thin-film magnetic circuit board and a core element having a magnetic gap.

13 Claims, 25 Drawing Sheets

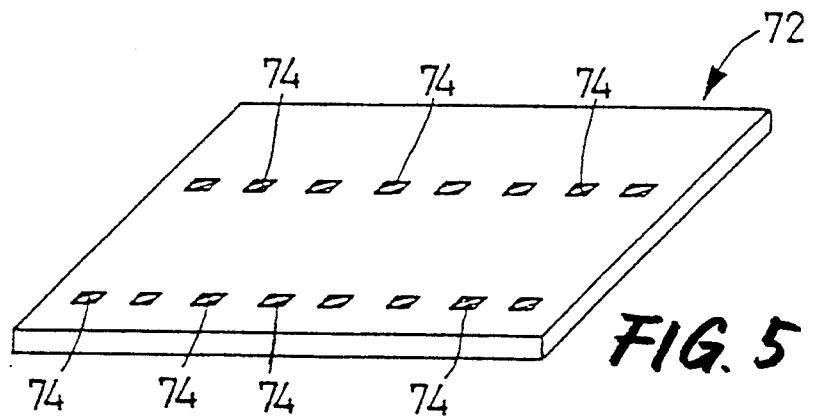
FIG. 5
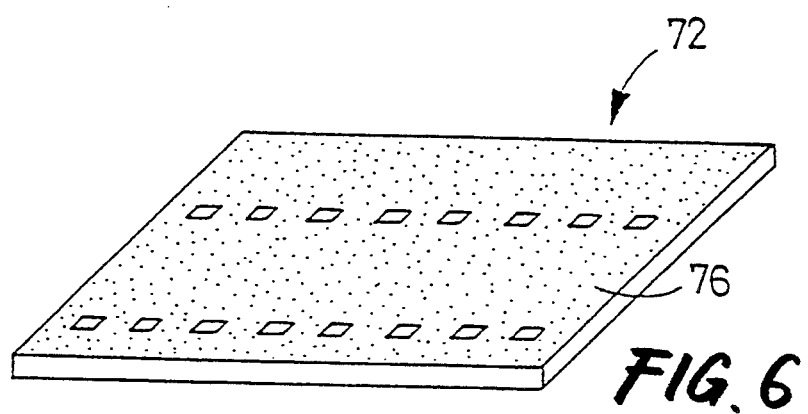
FIG. 6
FIG. 7
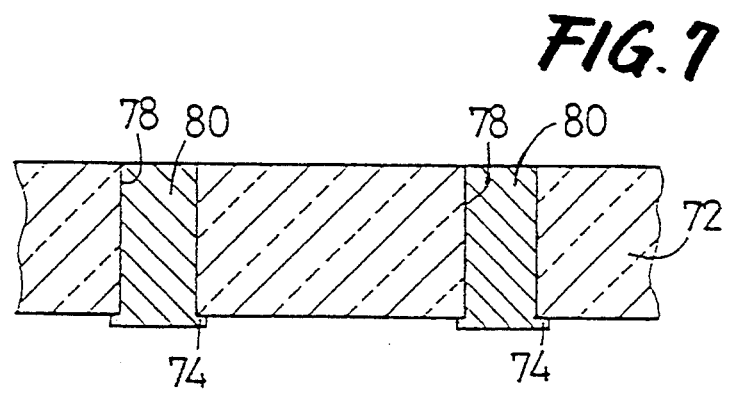

THIN-FILM MAGNETIC CIRCUIT BOARD AND MAGNETIC HEAD USING THE SAME

BACKGROUND OF THE INVENTION

1. Field of the Invention

The present invention relates to a thin-film magnetic circuit board, and to a magnetic head using such a circuit board. In particular, the invention is concerned with a magnetic head using a novel type of thin-film magnetic circuit board, which magnetic head can be manufactured with high efficiency, assuring relatively small magnetic resistance and improved operating efficiency.

2. Discussion of the Prior Art

As a type of magnetic head used with a floppy disk drive (FDD), hard disk drive (HDD) or other devices, there is known a so-called bulk-type magnetic head which includes a generally ring-shaped magnetic head core formed of a magnetic material such as ferrite, and a coil attached to the head core. An example of the bulk-type magnetic head is shown in FIG. 46, in which a pair of generally C-shaped core halves 2, 2 are butted and bonded together, to thereby provide a magnetic head core 6 having an annular magnetic path (magnetic circuit) and a magnetic gap 4 formed at a point of the circumference thereof so as to extend in a direction perpendicular to the magnetic path. The magnetic head core 6 has a central aperture 8 which is utilized for winding a coil 10 on the head core 6.

To produce this bulk-type magnetic head, however, the coil 10 must be wound through a considerably small aperture 6 formed through the magnetic head core 6. This coil-winding procedure is usually manually effected, and therefore accounts for about 20% of the whole cost of manufacturing the magnetic head. Thus, the above type of magnetic head is manufactured with low efficiency at an undesirably increased cost.

In recent years, there has been proposed a so-called thin-film type magnetic head which employs a magnetic film or films and an electrically conductive film formed by a thin-film forming method such as photoetching, to provide a magnetic circuit and a coil, respectively. An example of such a magnetic head is illustrated in FIG. 47, which is constructed such that a lower magnetic layer 14, a coil 16 and an upper magnetic layer 18 are superposed on a non-magnetic substrate 12 in the order of description, by a suitable thin-film forming method, and such that the lower and upper magnetic layers 14, 18 cooperate with a magnetic gap 20 formed therebetween to constitute a closed magnetic circuit.

While the coil 16 of the above magnetic head may be easily formed by the thin-film forming method, it is extremely difficult to form the upper and lower magnetic layers 18, 14 of the magnetic circuit by the same thin-film forming method so that the layers 18, 14 have a sufficiently large thickness. Consequently, the magnetic head of this type suffers from undesirably increased magnetic resistance in the magnetic circuit, resulting in deteriorated operating efficiency of the head.

Namely, neither of the bulk-type and thin-film type of magnetic heads is able to meet both requirements, i.e., high efficiency in producing the magnetic head and excellent operating characteristics of the head. Thus, the known magnetic heads have some room for improvement in the above respects.

SUMMARY OF THE INVENTION

It is therefore an object of the present invention to provide a novel thin-film magnetic circuit board, and a magnetic head using the circuit board, which head can be produced with high efficiency, and has a relatively small magnetic resistance and improved operating efficiency.

The above object may be attained according to one aspect of the present invention, which provides a thin-film magnetic circuit board comprising: a substrate formed of a non-magnetic material; a connector formed from a magnetic film on one of opposite major surfaces of the substrate, the connector having opposite end portions which protrude from the substrate to form a pair of protrusions; at least one coil formed from an electrically conductive film to provide a circuit pattern on the one major surface of the substrate, each coil having a spiral shape and surrounding a corresponding one of at least one of the protrusions of the connector; and a pair of leads which are electrically connected to opposite ends of the circuit pattern formed by the above-indicated at least one coil.

The thin-film magnetic circuit board having the coil(s) and connector as described above can be easily manufactured with significantly improved productivity, since the coils are efficiently formed from an electrically conductive thin film.

The above object may be also attained according to another aspect of the invention, which provides a magnetic head including the thin-film magnetic circuit board as defined above, and a core element comprising: a first and a second substrate formed of a magnetic material; and a non-magnetic layer interposed between mutually abutting surfaces of the first and second substrates, for bonding the first and second substrates to each other, the core element having a magnetic gap formed between the mutually abutting surfaces of the first and second substrates, the core element being superposed on one of opposite major surfaces of the thin-film magnetic circuit board on which the above-indicated at least one coil is formed, so that the first and second substrates are magnetically connected to one and the other of the protrusions of the connector, respectively, whereby the first and second substrates cooperate with the connector to provide a single closed magnetic circuit including said magnetic gap.

In the magnetic head using the thin-film magnetic circuit board as described above, the magnetic circuit includes the first and second substrates formed of a bulk-type magnetic material. Therefore, the present magnetic head has a significantly reduced magnetic resistance in its magnetic circuit, and thereby exhibits excellent operating efficiency.

For producing the magnetic head constructed as described above, the formation of coils by a thin-film forming method may be effected independently of the formation of a magnetic gap by a machining process. Thus, the coils, magnetic gap and others can be easily formed, assuring further improved productivity of the magnetic head.

BRIEF DESCRIPTION OF THE DRAWINGS

The foregoing and other objects, features and advantages of the present invention will become more apparent by reading the following detailed description of a presently preferred embodiment of the invention, when considered in connection with the accompanying drawings, in which:

FIG. 5 is a perspective view explaining a first step for preparing the magnetic circuit board of FIG. 2;

FIG. 6 is a perspective view explaining a second step for preparing the magnetic circuit board of FIG. 2;

FIG. 7 is a cross sectional view explaining a third step for preparing the magnetic circuit board of FIG. 2;

DETAILED DESCRIPTION OF THE PREFERRED EMBODIMENT

Figure 1:
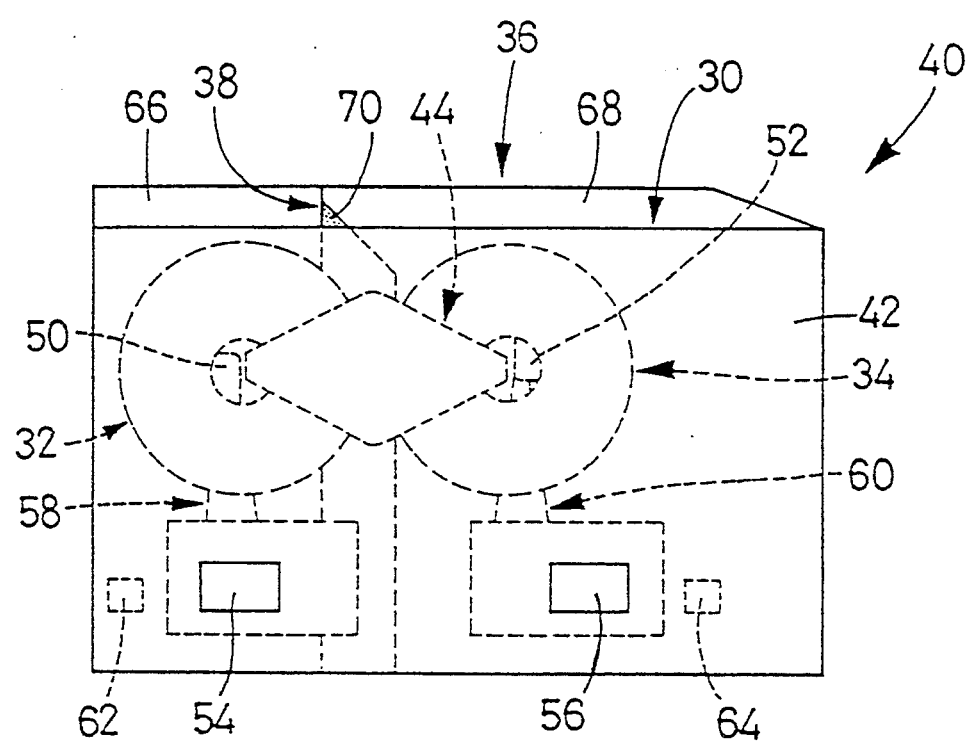
FIG. 1 is a front elevational view of one embodiment of a magnetic head of the present invention.

Referring first to FIG. 1, there is illustrated one embodiment of a magnetic head of the present invention, which incorporates a thin-film magnetic circuit board constructed according to the present invention. In FIG. 1, reference numeral 30 denotes a magnetic circuit board having a pair of coils 32, 34 while reference numeral 36 denotes a magnetic head core in the form of a core element having a magnetic gap 38 (which will be described). In the instant embodiment, the magnetic circuit board and core element 30, 36 are butted and bonded together, to form a magnetic head 40 which has a closed magnetic path including the magnetic gap 38.

More specifically described referring to FIG. 2, the magnetic circuit board 30 has a rectangular planar substrate 42 formed of a non-magnetic material desirably having a high degree of electrical resistance as well as a low degree of magnetic permeability, in view of formation of coils and leads on the substrate 42 (which will be described). For example, alumina ($Al_2O_3$) or calcium titanate ($CaTiO_3$) is favorably employed as the non-magnetic material.

On one of opposite major surfaces (hereinafter referred to as "inner surface") of the non-magnetic substrate 42, there is provided a connector 44 which is prepared from a magnetic film by a thin-film forming method. The connector 44 extends a given length in the longitudinal direction of the substrate 42, and has longitudinally opposite end portions having a larger thickness than the other portions. Namely, the connector 44 is formed at its longitudinally opposite ends with a pair of protrusions 46, 48 having a suitable height. The connector 44 and protrusions 46, 48 are favorably formed of a magnetic material, such as Ni-Fe and other alloys, which can be easily formed into thin films.

Figure 29:
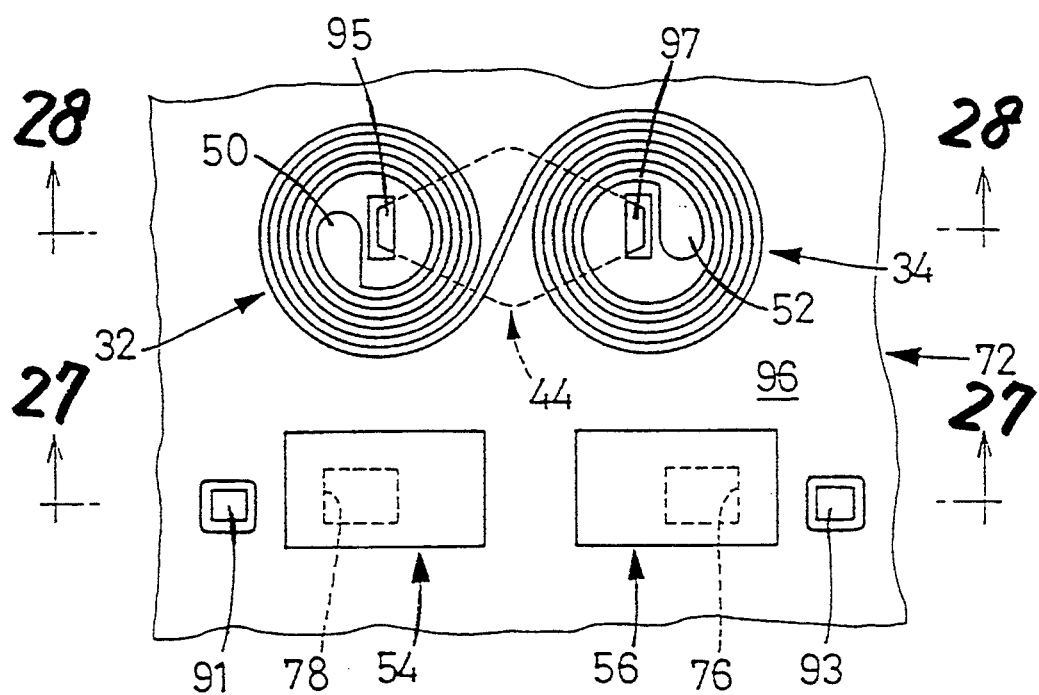
FIG. 29 is a plan view explaining the eleventh step for preparing the magnetic circuit board of FIG. 2.

On the inner surface of the non-magnetic substrate 42, there are also provided a pair of coils 32, 34 which are prepared from an electrically conductive thin film by a thin-film forming method, such that the coils 32, 34 are formed in spiral configuration around the respective protrusions 46, 48. The coils 32, 34 cooperate with each other to constitute a continuous circuit pattern, whose opposite ends 50, 52 are located at the centers of the respective coils 32, 34, as shown in FIG. 29. The electrically conductive thin film which gives the coils 32, 34 may be formed of copper, or a copper-base alloy such as Cu-Al. The coils 32, 34 are formed on the substrate 42 through the connector 44. Where the connector 44 is formed of an electrically conductive material, therefore, an insulating layer is interposed between the coils 32, 34 and the connector 44.

The magnetic circuit board 30 further includes a pair of leads 54, 56 formed in the non-magnetic substrate 42 apart from the coils 32, 34 and connector 44. These leads 54, 56 are formed so as to extend over the entire thickness of the substrate 42, such that the leads 54, 56 are exposed at the outer surface of the substrate 42 (on which the coils 32, 34 are not formed) as well as the inner surface thereof. On the inner surface of the substrate 42 are further provided a pair of electrically conductive layers 58, 60 adapted for electrically connecting these leads 54, 56 to the respective ends 50, 52 of the coils 32, 34.

With the conductive layers 58, 60 formed in position, recording (writing) current or reproducing (reading) current may be applied to or retrieved from the coils 32, 34, through the leads 54, 56 which extend to the outer surface of the substrate 42. Like the coils 32, 33, the leads 54, 56 and conductive layers 58, 60 are made of an electrically conductive material, such as copper, Cu-Al and Ni-Fe, and are formed by a suitable thin-film forming method.

The magnetic circuit board 30 further has a pair of spacers 62, 64, which are formed close to and outwardly of the respective leads 54, 56 and protrude a suitable distance from the inner surface of the substrate 42. Preferably, the spacers 62, 64 have substantially the same height as the protrusions 46, 48 of the connector 44.

Figure 3:
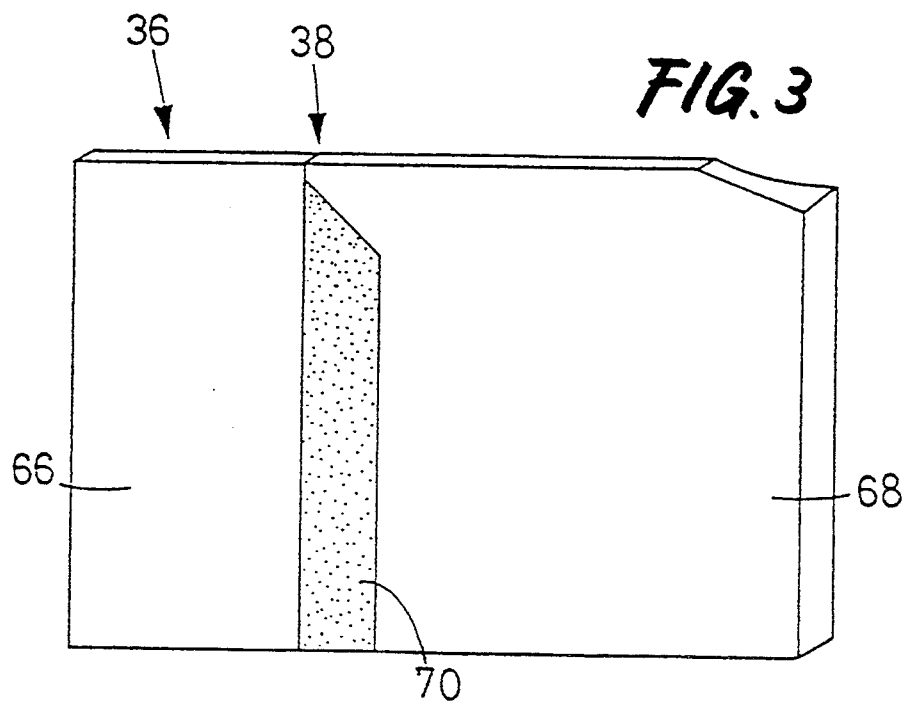
FIG. 3 is a perspective view showing a core element of the magnetic head of FIG. 1.

Referring next to FIG. 3, the core element 36 includes a first and a second substrate formed of a magnetic material, i.e., a first core substrate 66 and a second core substrate 68 both having a generally rectangular planar shape. The first and second core substrates 66, 68 are bonded together through a non-magnetic bonding layer 70 made of a glass material, for example, to form an integral flat plate as the core element 36. The first and second core substrates 66, 68 are formed of Ni-Zn ferrite or other materials which are conventionally used for head cores and have a high degree of magnetic permeability.

The above-indicated magnetic gap 38 is formed between mutually abutting surfaces of the first and second core substrates 66, 68 of the core element 36, so that the thus formed gap 38 is adapted to face a magnetic recording medium upon operating of the magnetic head 40. Like a magnetic gap formed in the conventional magnetic head core, the magnetic gap 38 has a predetermined width as measured in the direction of thickness of the first and second core substrates 66, 68, and a predetermined depth as measured in the longitudinal direction of the mutually abutting surfaces of the core substrates 66, 68.

As shown in FIG. 1, the magnetic circuit board 30 and the core element 36 are superposed on each other, and formed into an integral assembly by a suitable bonding agent or clamping means, such that one end portion of the core element 36 which includes the magnetic gap 38 protrudes outwards from the circuit board 30 by a suitable distance. With the magnetic circuit board 30 superposed on the core element 36, only the protrusions 46, 48 and spacers 62, 64 are held in abutting contact with the inner surface of the core element 36. Accordingly, the magnetic circuit board 30 and core element 36 are opposed to each other such that most of their mutually facing surfaces are spaced apart from each other by a distance equal to the height of the protrusions 46, 48 and spacers 62, 64. In this condition, the protrusions 46, 48 are magnetically connected to the first and second core substrates 66, 68 of the core element 36, respectively. Thus, the intended magnetic head 40 as shown in FIG. 1 is obtained.

In the thus constructed magnetic head 40, the connector 44 of the magnetic circuit board 30 and the first and second core substrates 66, 68 of the core element 36 constitute a single closed magnetic circuit including the magnetic gap 38. As known in the art, the closed magnetic circuit is adapted to apply a magnetic field to a magnetic recording medium or detect a magnetic field generated by a magnetic recording medium, through the coils 32, 34, so as to effect the information writing and reading operation.

Figure 4:
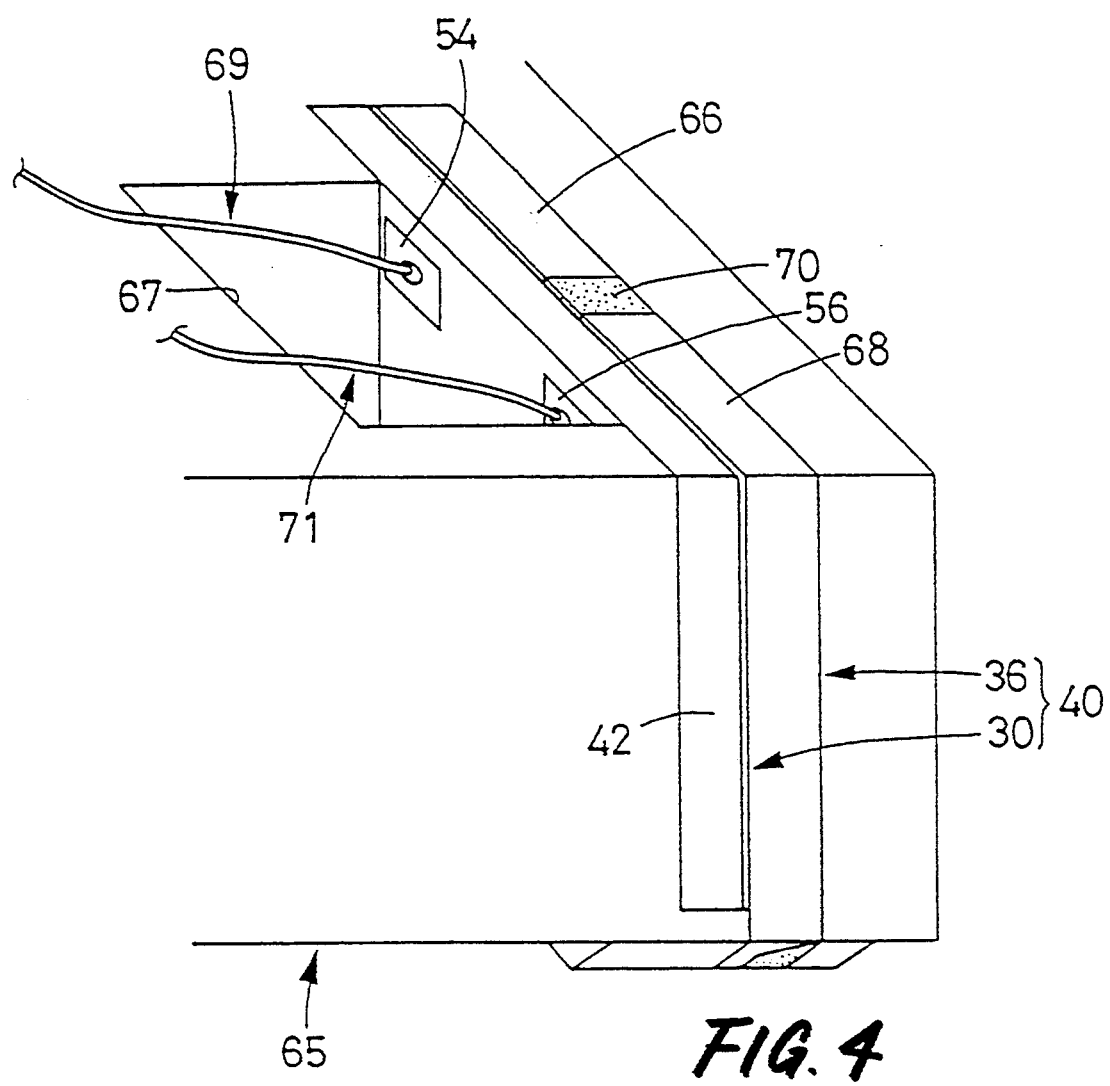
FIG. 4 is a fragmentary perspective view showing by way of example the magnetic head of FIG. 1 as installed on a core slider.

The magnetic head 40 may be assembled into or mounted on a core slider 65, as shown in FIG. 4 by way of example, to constitute a composite-type magnetic head for a hard disk drive (HDD). In FIG. 4, reference numeral 67 denotes a recess used for connecting lead wires to the coils 32, 34. In this recess 67, lead wires 69, 71 are respectively connected to the leads 54, 56 of the magnetic head 40.

There will be hereinafter described in detail one example of a manner of producing the magnetic head 40 constructed as described above. It is to be understood that thickness and other dimensions of various thin films as viewed in the figures do not necessarily correspond to the actual dimensions, in order to assure easy understanding of the following thin-film forming process.

In producing the magnetic head 40, the magnetic circuit board 30 as described above is first formed in the following manner. Referring to FIG. 5, a plate 72 is prepared which is formed of a non-magnetic material such as alumina or calcium titanate and which gives the non-magnetic substrate 42 of the circuit board 30. Then, a plurality of copper films 74 are formed on one of opposite major surfaces of the plate 72 (which will be the outer surface of the substrate 42), to provide base films (electrodes) used in the following electroplating step for forming the leads 54, 56.

Subsequently, a photo resist 76 is applied to the other major surface of the plate 72 (which will be the inner surface of the substrate 42), and processed by the known photolithography method so that the other surface of the plate 72 is covered with the photo resist 72 except its portions corresponding to the copper films 74, as shown in FIG. 6.

The other surface of the plate 72 which carries the photo resist 76 is then subjected to etching so that through holes 78 are formed through the thickness of the plate 72 so as to reach the copper films 74 formed on the above-indicated one surface of the plate 72. Thereafter, the through holes 78 are filled with copper by electroplating, so that through conductors 80 are formed in the plate 72, as shown in FIG. 7. Then, the photo resist 76 is removed.

The thus obtained plate 72 is cut into a plurality of magnetic circuit boards 30 after a plurality of identical patterns including those of the coils 32, 34 and connector 44 are formed on the plate 72. In the following description, however, the manner of producing only one of the magnetic circuit boards 30 will be described.

Figure 8:
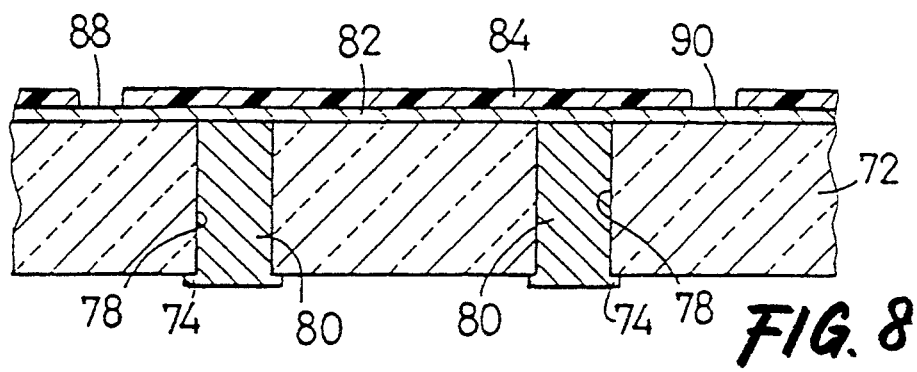
FIG. 8 is a cross sectional view explaining a fourth step for preparing the magnetic circuit board of FIG. 2, taken along line 8—8 of FIG. 10.
Figure 9:
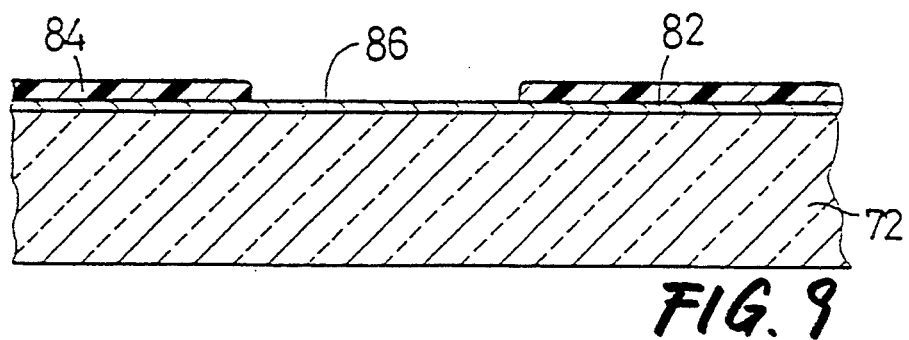
FIG. 9 is a cross sectional view explaining the fourth step indicated above, taken along line 9—9 of FIG. 10.
Figure 10:
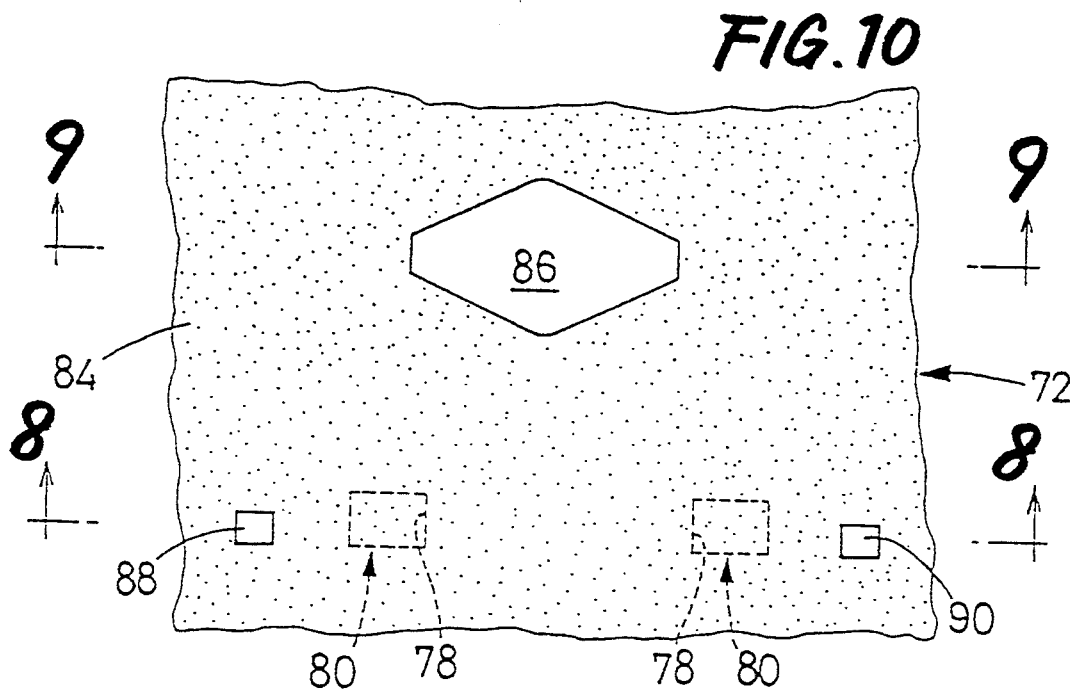
FIG. 10 is a plan view explaining the fourth step for preparing the magnetic circuit board of FIG. 2.

Initially, the connector 44 is formed on the plate 72, as shown in FIG. 8 through 10. Namely, a Ni-Fe magnetic film 82 which serves as a base film (electrode) in the following electroplating step is formed by sputtering over the entire area of one major surface of the plate 72 (which will be the inner surface of the substrate 42).

Subsequently, a photo resist 84 is applied by coating to the magnetic film 82 on the plate 72 over its entire surface area, and then exposed and developed so that a pattern 86 for the connector 44 and patterns 88, 90 for the spacers 62, 64 are formed on the film 82. Upon completion of this photolithography step, the magnetic film 82 is exposed at its portions on which the connector 44 and spacers 62, 64 are to be formed, with the other portions covered with the photo resist 84.

Figure 11:
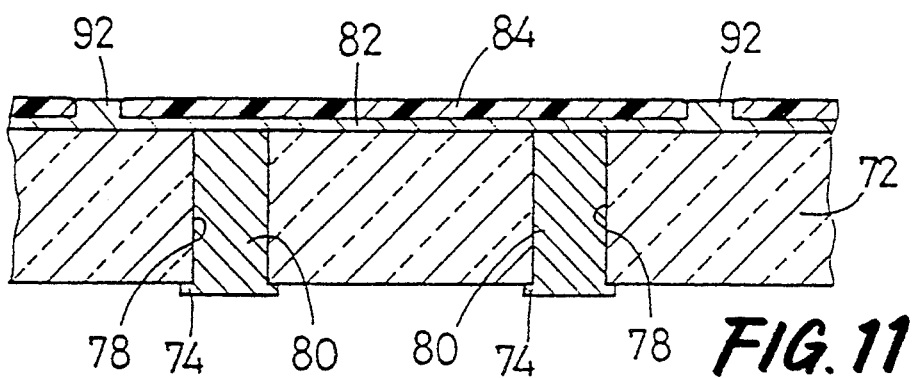
FIG. 11 is a cross sectional view corresponding to that of FIG. 8, explaining a fifth step for preparing the magnetic circuit board of FIG. 2.
Figure 12:
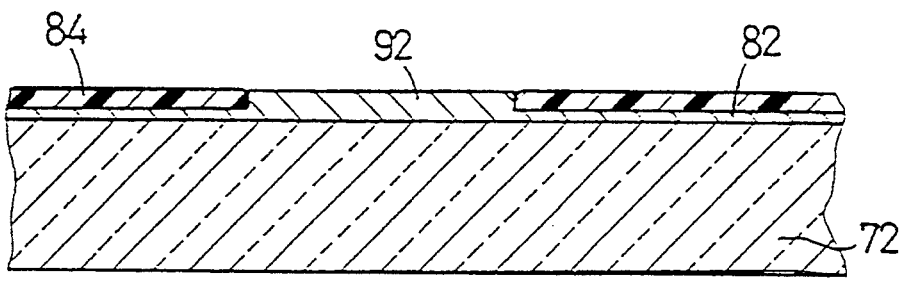
FIG. 12 is a cross sectional view corresponding to that of FIG. 9, explaining the above-indicated fifth step.
Figure 13:
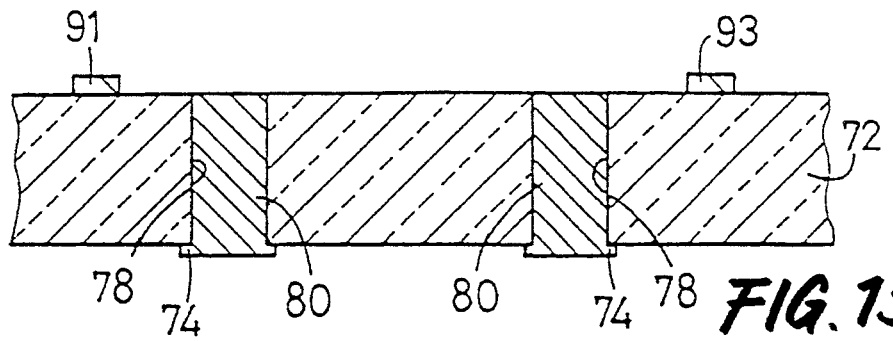
FIG. 13 is a cross sectional view explaining a sixth step for preparing the magnetic circuit board of FIG. 2, taken along line 13—13 of FIG. 15.
Figure 14:
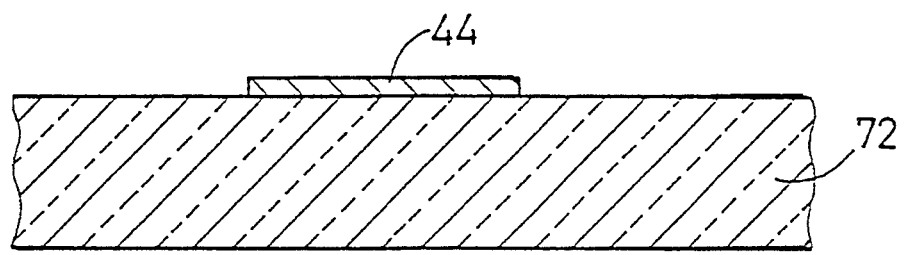
FIG. 14 is a cross sectional view explaining the sixth step indicated above, taken along line 14—14 of FIG. 15.
Figure 15:
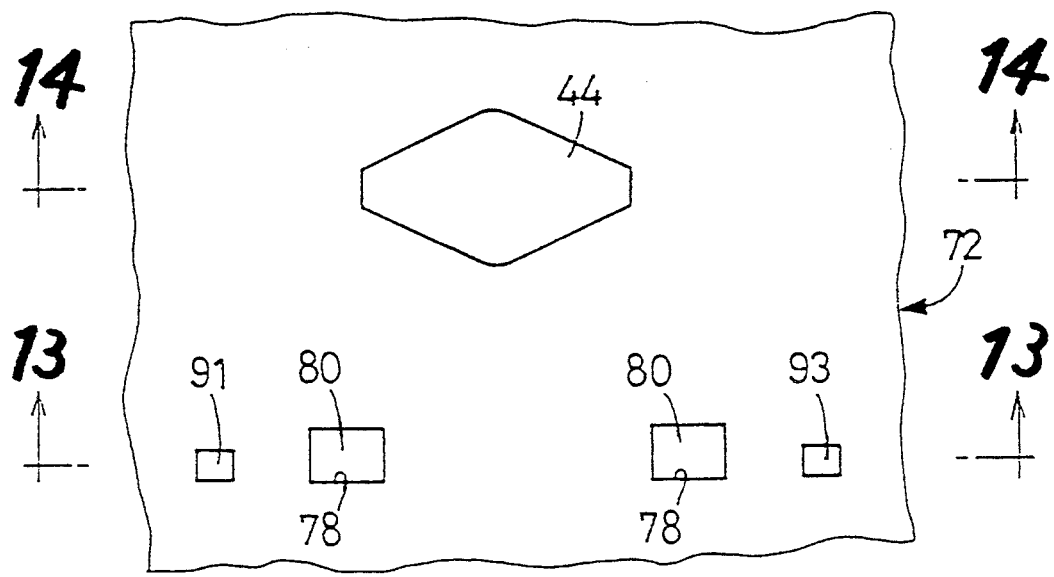
FIG. 15 is a plan view explaining the sixth step for preparing the magnetic circuit board of FIG. 2.

Thereafter, the plate 72 which carries the photo resist 84 is electroplated with a Ni-Fe magnetic material, so that a magnetic layer 92 is formed on the exposed portions of the magnetic film 82, to provide an integral magnetic lamination 82, 92, as shown in FIGS. 11 and 12. Then, the photo resist 84 is removed, and the magnetic film 82 and magnetic layer 92 are subjected to ion-milling or ion-etching, and thus etched by an amount corresponding to the thickness of the magnetic film 82, as shown in FIGS. 13, 14 and 15. Consequently, the connector 44 and base portions 91, 93 of the spacers 62, 64 are formed on the plate 72.

Figure 16:
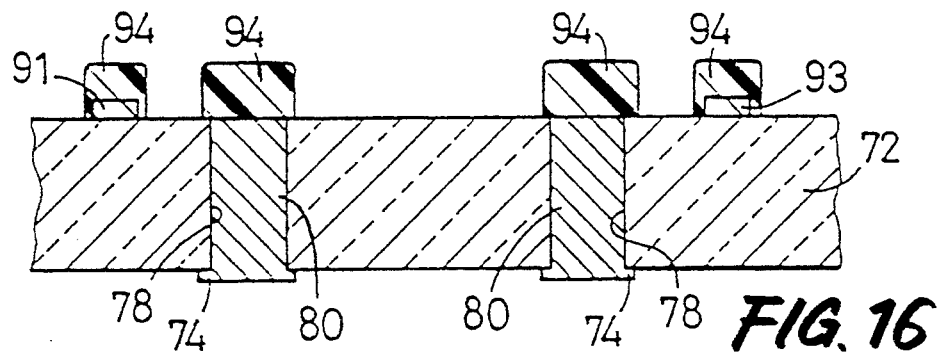
FIG. 16 is a cross sectional view explaining a seventh step for preparing the magnetic circuit board of FIG. 2, taken along line 16—16 of FIG. 18.
Figure 17:
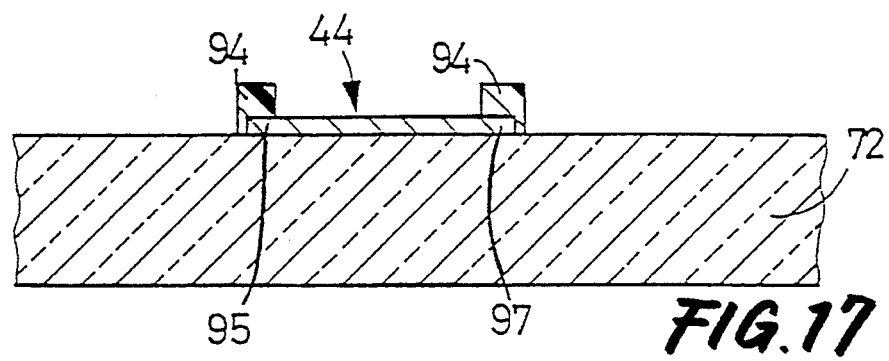
FIG. 17 is a cross sectional view explaining the seventh step indicated above, taken along line 17—17 of FIG. 18.
Figure 18:
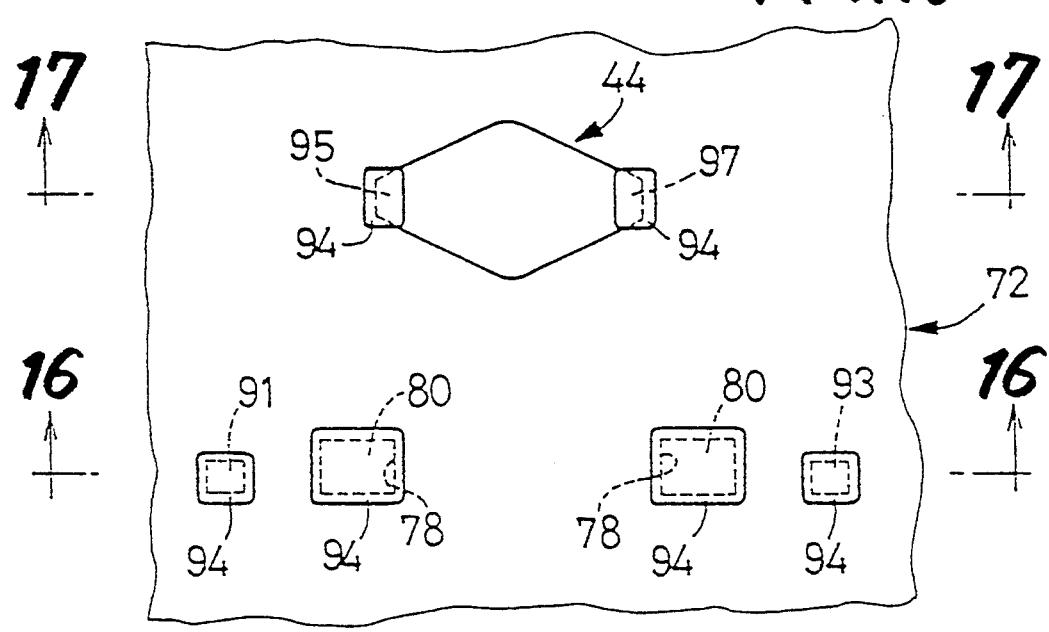
FIG. 18 is a plan view explaining the seventh step for preparing the magnetic circuit board of FIG. 2.

After the formation of the connector 44 and spacer base portions 91, 93, a photo resist 94 is applied by coating over the entire surface area of the plate 72, and then exposed and developed so that end faces of the through conductors 80, 80, the spacer base portions 91, 93 and opposite end portions 95, 97 of the connector 44 are covered with the photo resist 94, as shown in FIGS. 16, 17 and 18.

Figure 19:
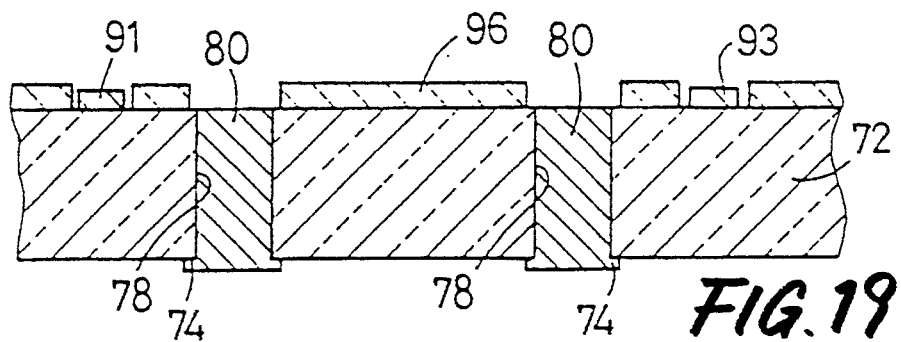
FIG. 19 is a cross sectional view explaining a eighth step for preparing the magnetic circuit board of FIG. 2, taken along line 19—19 of FIG. 21.
Figure 20:
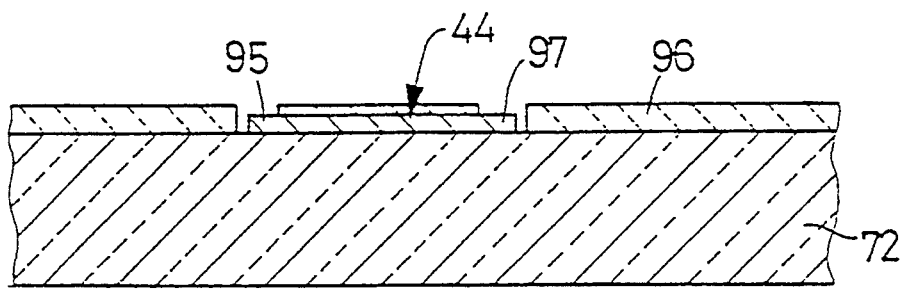
FIG. 20 is a cross sectional view explaining the eighth step indicated above, taken along line 20—20 of FIG. 21.
Figure 21:
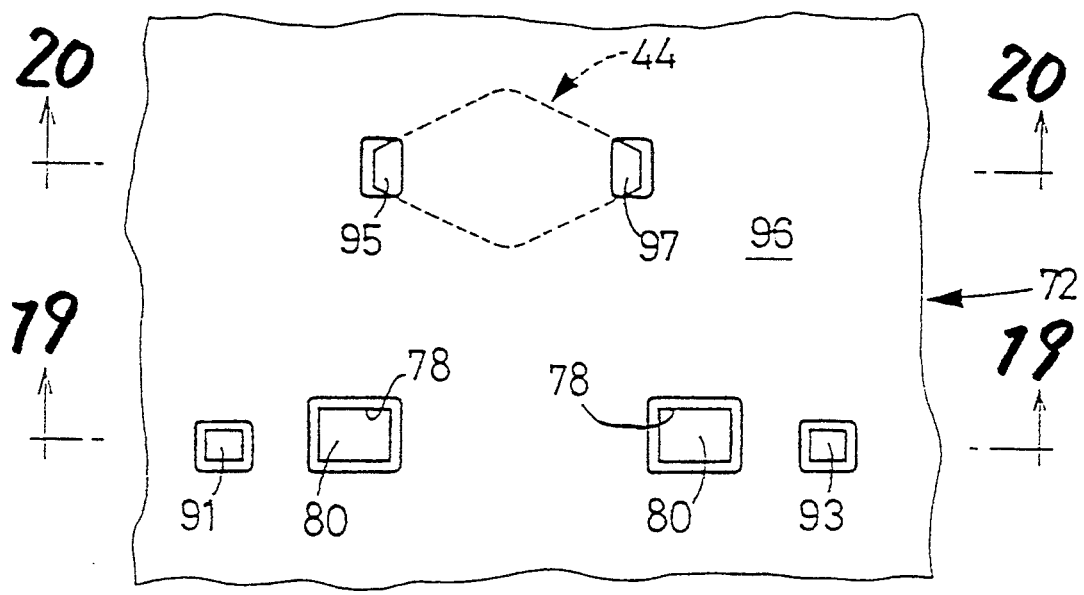
FIG. 21 is a plan view explaining the eighth step for preparing the magnetic circuit board of FIG. 2.

Subsequently, an insulating material such as $SiO_2$ or $Al_2O_3$ is applied by sputtering over the entire surface area of the plate 72 which carries the photo resist 94. Then, the photo resist 94 is removed. As a result, the plate 72 is covered by an insulating layer 96 such that only the through conductors 80, 80, spacer base portions 91, 93 and end portions 95, 97 of the connector 44 are exposed, as shown in FIGS. 19, 20 and 22.

In the next step, the coils 32, 34 and leads 54, 56 are formed on the insulating layer 96 covering the plate 72. Initially, a copper film 98 (FIG. 22) is formed by sputtering on the entire area of the surface of the plate 72 on which the insulating layer 96 is provided. This copper film 98 serves as a base film (electrode) used in the following electroplating step.

Figure 22:
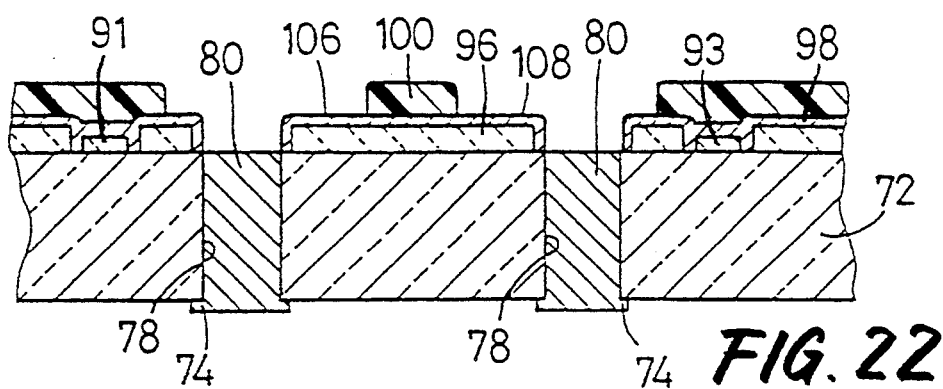
FIG. 22 is a cross sectional view explaining a ninth step for preparing the magnetic circuit board of FIG. 2, taken along line 22—22 of FIG. 24.
Figure 23:
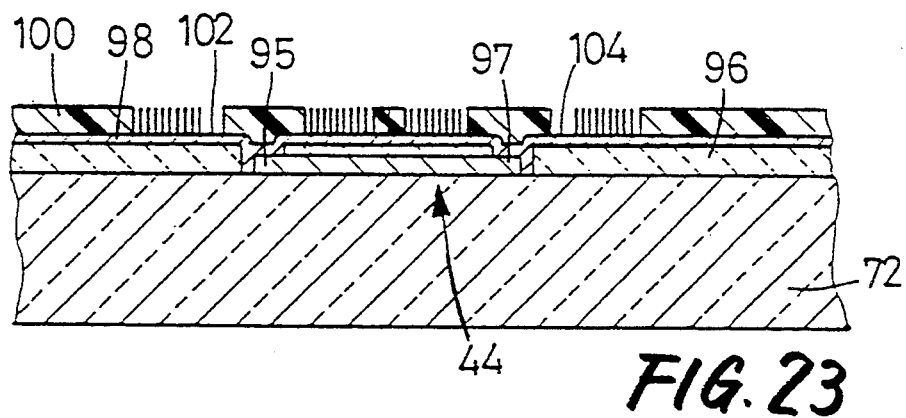
FIG. 23 is a cross sectional view explaining the ninth step indicated above, taken along line 23—23 of FIG. 24.
Figure 24:
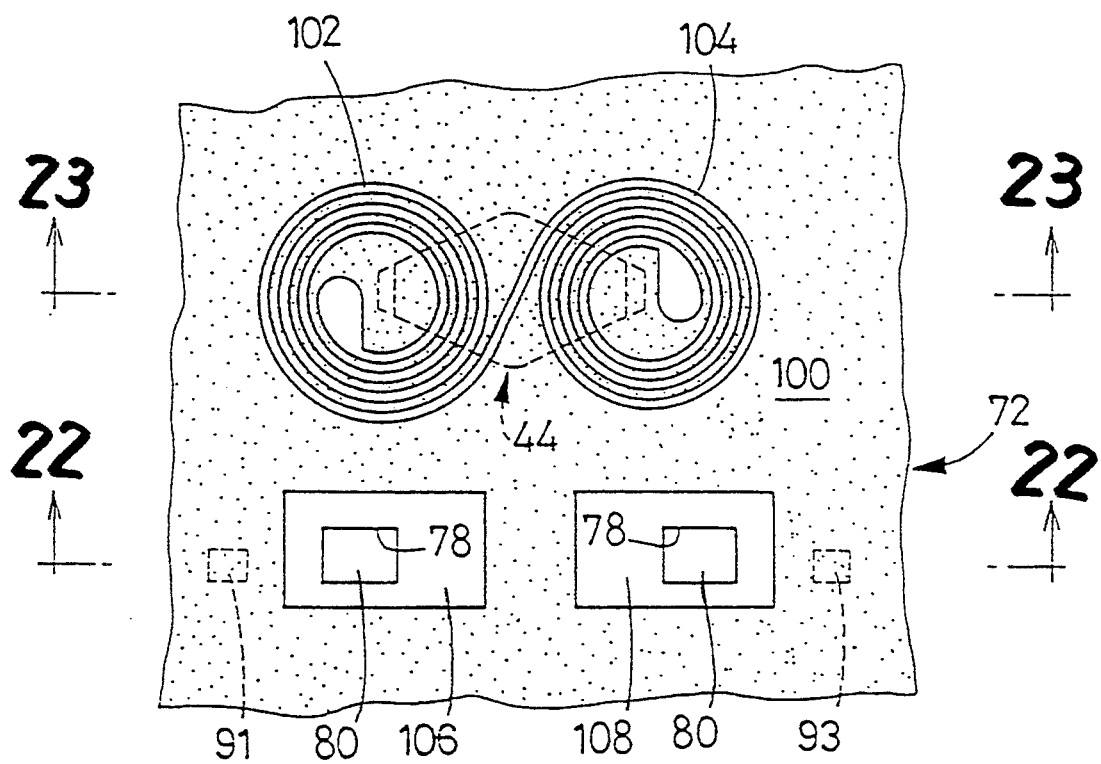
FIG. 24 is a plan view explaining the ninth step for preparing the magnetic circuit board of FIG. 2.
Figure 25:
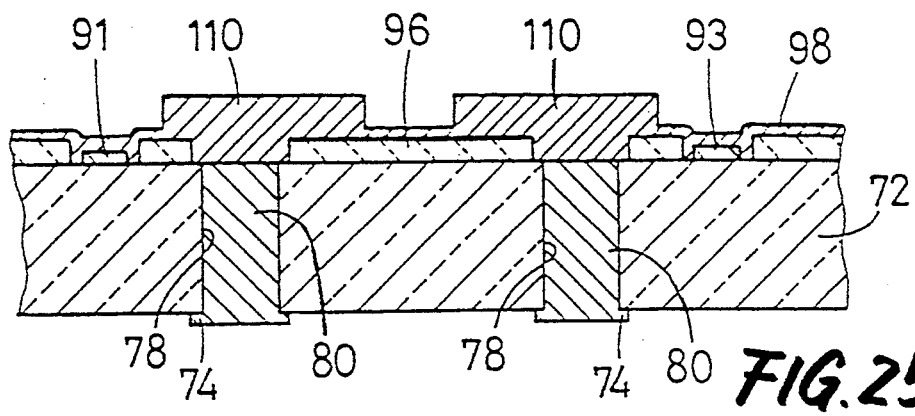
FIG. 25 is a cross sectional view corresponding to that of FIG. 22, explaining a tenth step for preparing the magnetic circuit board of FIG. 2.
Figure 26:
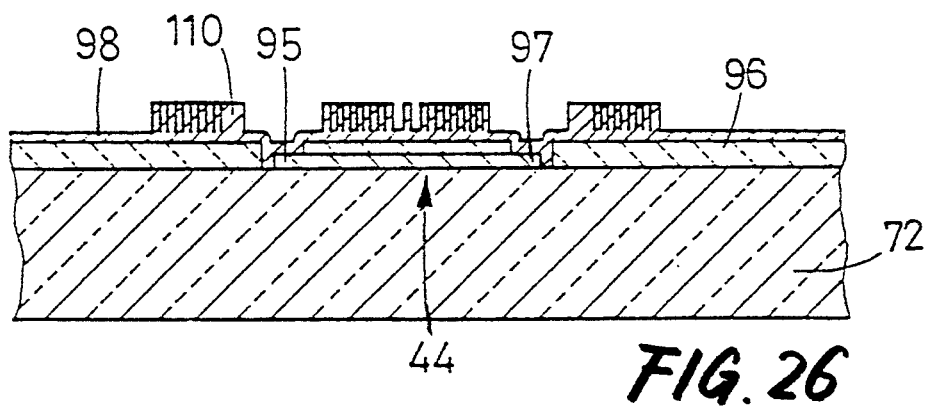
FIG. 26 is a cross sectional view corresponding to that of FIG. 23, explaining the above-indicated tenth step.

As shown in FIGS. 22, 23 and 24, a photo resist 100 is applied by coating over the entire area of the copper film 98, and then exposed and developed so that patterns 102, 104 for the coils 32, 34 and patterns 106, 108 for the leads 54, 56 are formed on the film 98. Upon completion of this photolithography step, the copper film 98 is exposed at its portions where the coils 32, 34 and leads 54, 56 are to be formed, with the other portions covered by the photo resist 100. It is to be understood that the number of turns of the coil patterns 102, 104 of FIG. 24 is smaller than that of FIG. 23, in order to assure easy understanding of the plane form of the coil patterns 102, 104 as shown in FIG. 24.

Figure 27:
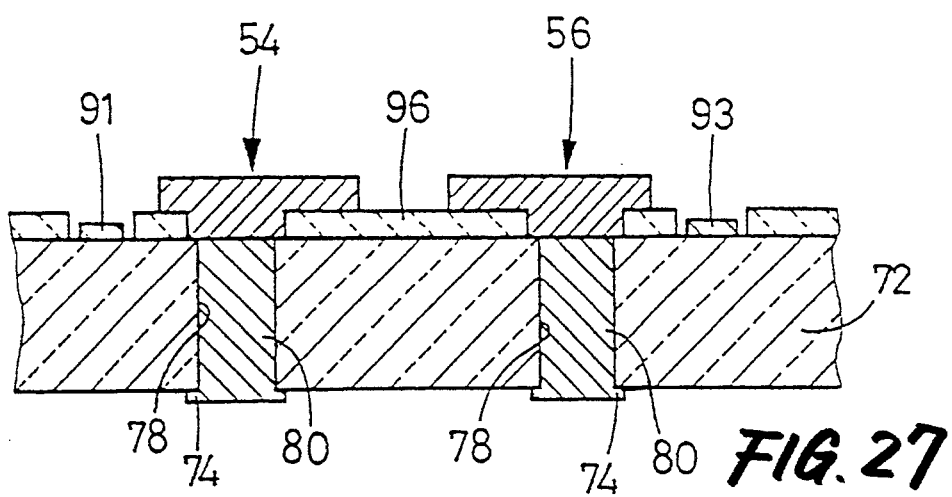
FIG. 27 is a cross sectional view explaining an eleventh step for preparing the magnetic circuit board of FIG. 2, taken along line 27—27 of FIG. 29.
Figure 28:
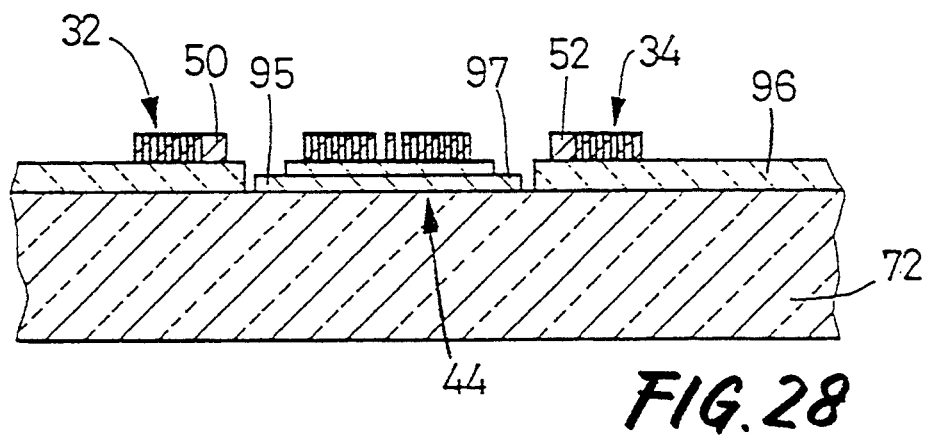
FIG. 28 is a cross sectional view explaining the eleventh step indicated above, taken along line 28—28 of FIG. 29.

Subsequently, the plate 72 which carries the photo resist 100 is electroplated with copper, so that copper layers 110 are formed on the patterns 102, 104, 106 and 108 at which the copper film 98 is exposed. Then, the photo resist 100 is removed. Thereafter, the copper film 98 and copper layers 110 are etched by an amount corresponding to the thickness of the copper film 98, whereby the desired coils 32, 34 and leads 54, 56 are formed as shown in FIGS. 27, 28 and 29.

After the formation of the coils 32, 34 and leads 54, 56, the electrically conductive layers 58, 60, protrusions 46, 48 and spacers 62, 64 are then formed on the plate 72. Initially, a photo resist 112 is applied by coating to the surface of the plate 72 on which the coils and others are formed, and then exposed and developed so that the photo resist 112 covers only the opposite end portions 95, 97 of the connector 44, opposite ends 50, 52 of the coils 32, 34, contacts 120, 122 (FIG. 32) of the leads 54, 56, and spacer base portions 91, 93, as shown in FIGS. 30, 31 and 32.

Figure 30:
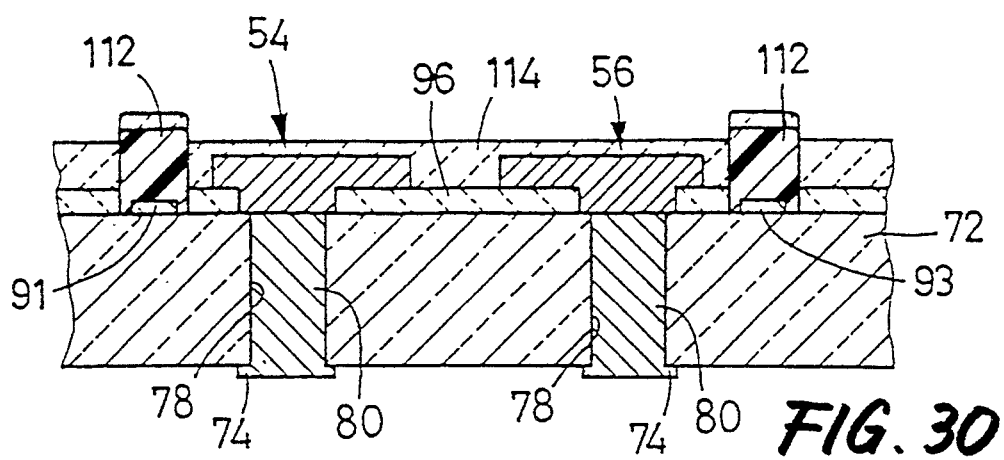
FIG. 30 is a cross sectional view explaining a twelfth step for preparing the magnetic circuit board of FIG. 2, taken along line 30—30 of FIG. 32.
Figure 31:
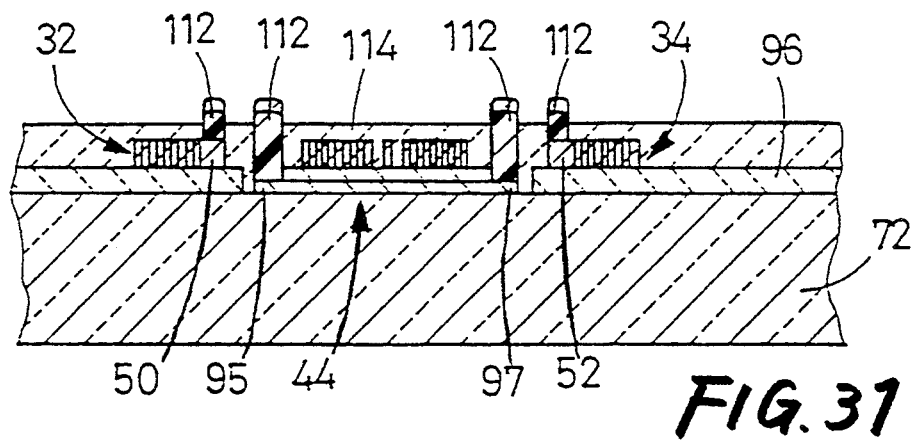
FIG. 31 is a cross sectional view explaining the twelfth step indicated above, taken along line 31—31 of FIG. 30.
Figure 32:
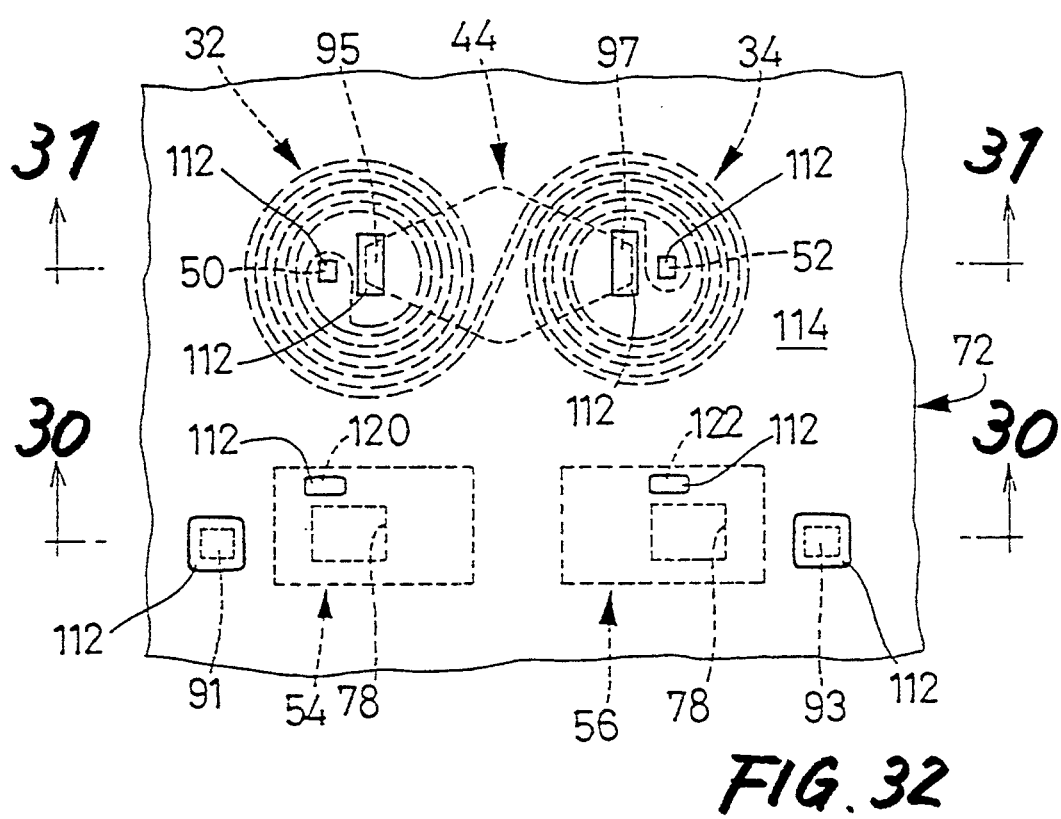
FIG. 32 is a plan view explaining the twelfth step for preparing the magnetic circuit board of FIG. 2.
Figure 33:
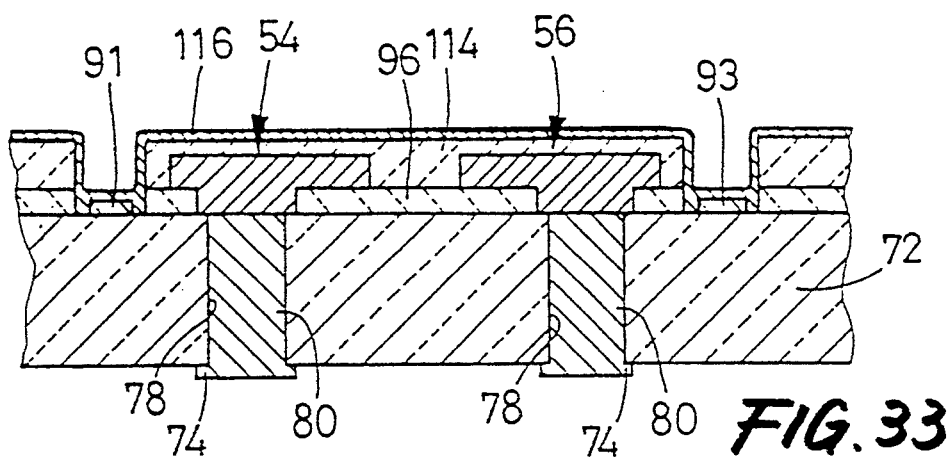
FIG. 33 is a cross sectional view corresponding to that of FIG. 30, explaining a thirteenth step for preparing the magnetic circuit board of FIG. 2.
Figure 34:
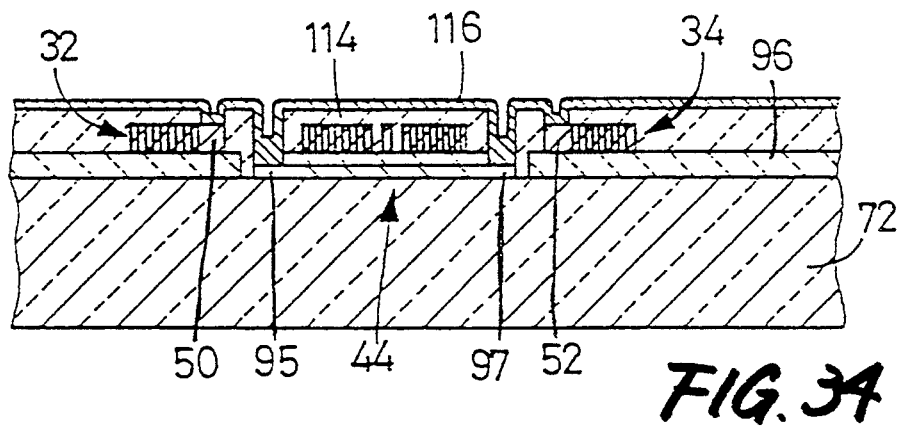
FIG. 34 is a cross sectional view corresponding to that of FIG. 31, explaining the above-indicated thirteenth step.

Subsequently, an insulating material such as $SiO_2$ or $Al_2O_3$ is applied by sputtering over the entire surface area of the plate 72 which carries the photo resist 112, so that an insulating layer 114 is formed on the plate 72 as shown in FIGS. 30, 31 and 32. Then, the photo resist 112 is removed. As a result, only the opposite end portions 95, 97 of the connector 44, opposite ends 50, 52 of the coils 32, 34, contacts 120, 122 (FIG. 32) of the leads 54, 56, and spacer base portions 91, 93 are not covered by the insulating layer 114 but are exposed to the outside.

Further, a Ni-Fe magnetic film 116 is formed by sputtering over the entire area of the surface of the plate 72 on which the insulator layer 114 is formed. This Ni-Fe magnetic film 116 serves as a base film (electrode) used in the following electroplating step.

Figure 35:
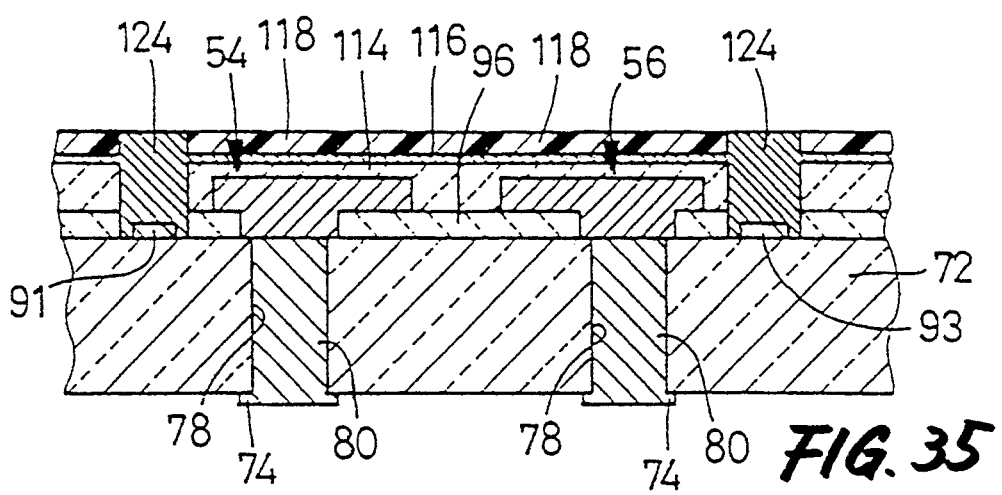
FIG. 35 is a cross sectional view explaining a fourteenth step for preparing the magnetic circuit board of FIG. 2, taken along line 35—35 of FIG. 37.
Figure 36:
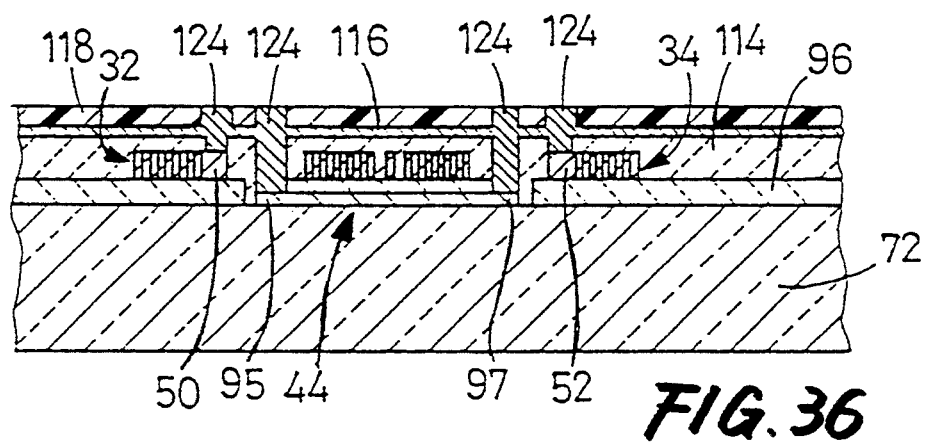
FIG. 36 is a cross sectional view explaining the fourteenth step indicated above, taken along line 36—36 of FIG. 37.
Figure 37:
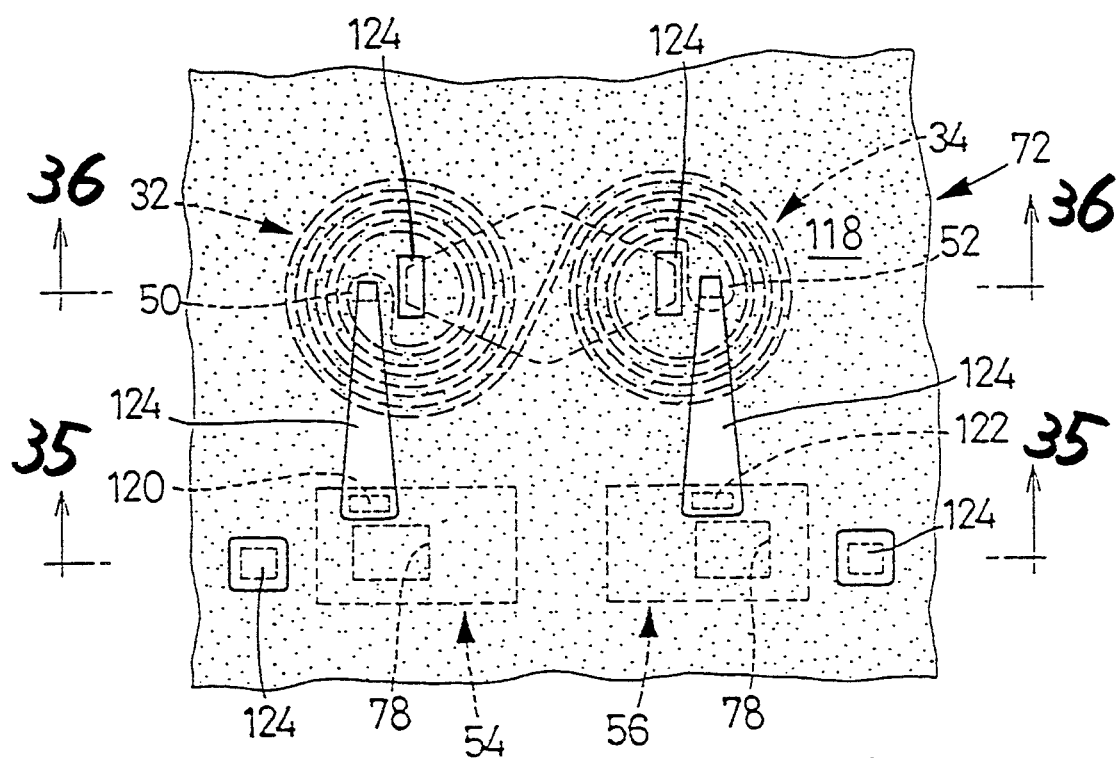
FIG. 37 is a plan view explaining the fourteenth step for preparing the magnetic circuit board of FIG. 2.

Then, a photo resist 118 is applied by coating over the entire area of the magnetic film 116, and then exposed and developed so that patterns for the conductive layers 58, 60, protrusions 46, 48 and spacers 62, 64 are formed on the film 116. Thereafter, a Ni-Fe magnetic material is applied by electroplating, so that magnetic layers 124 are formed on the exposed portions of the magnetic film 116 which correspond to the above-indicated patterns, as shown in FIGS. 35, 36 and 37.

Figure 38:
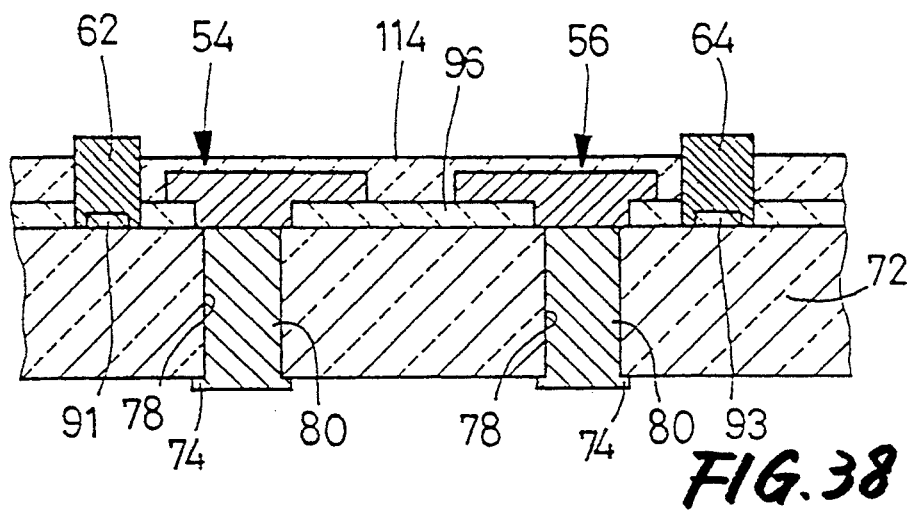
FIG. 38 is a cross sectional view explaining a fifteenth step for preparing the magnetic circuit board of FIG. 2, taken along line 38—38 of FIG. 40.
Figure 39:
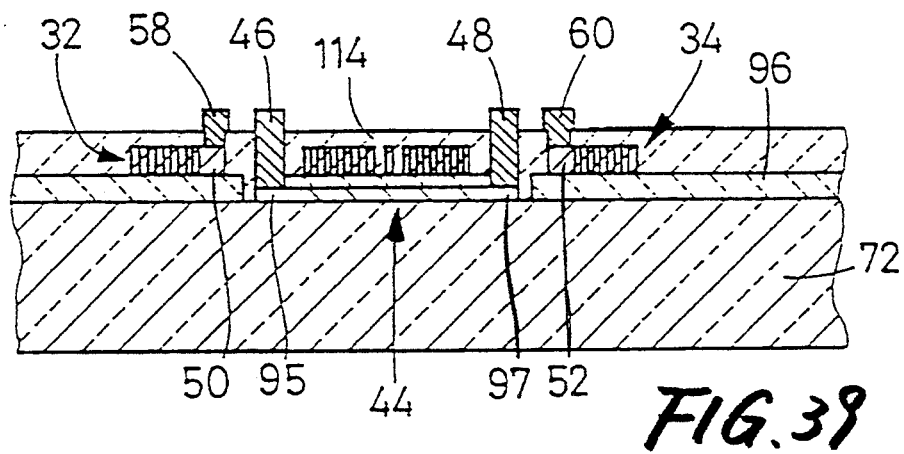
FIG. 39 is a cross sectional view explaining the fifteenth step indicated above, taken along line 39—39 of FIG. 40.
Figure 40:
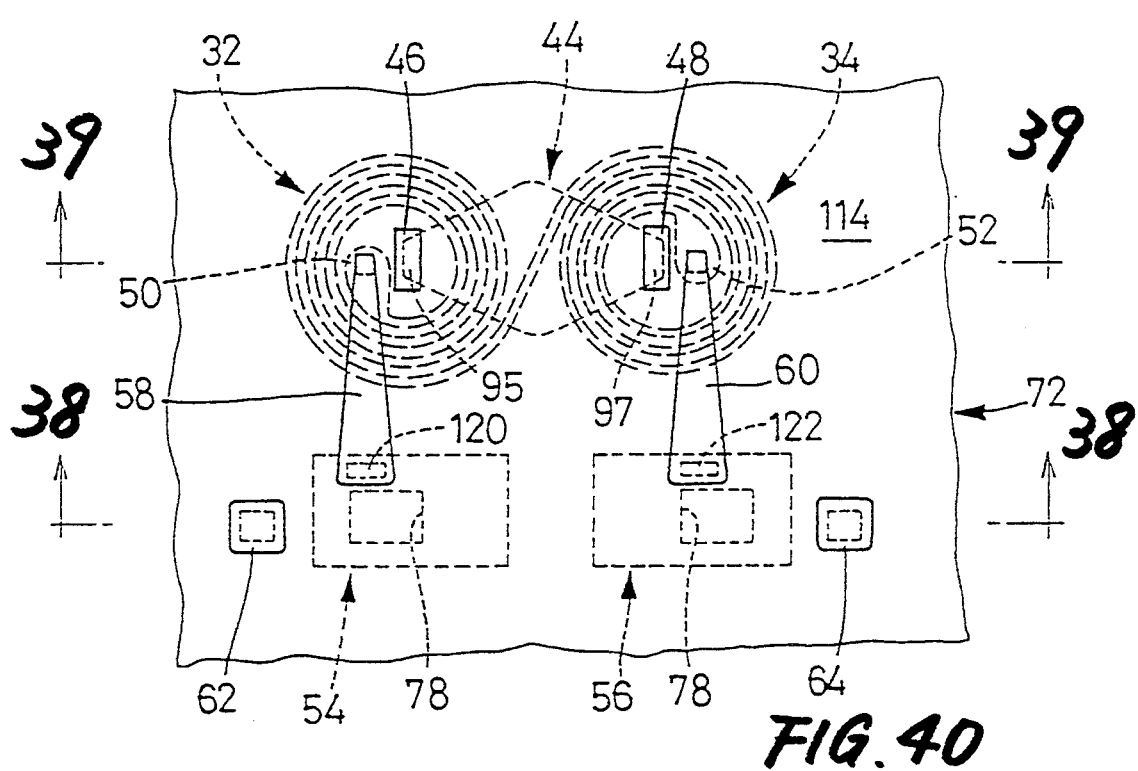
FIG. 40 is a plan view explaining the fifteenth step for preparing the magnetic circuit board of FIG. 2.

After the photo resist 118 is removed, the Ni-Fe magnetic layer 116, 124 is subjected to ion-milling, and thus etched by an amount corresponding to the thickness of the magnetic film 116. Consequently, the conductive layers 58, 60 are formed on the plate 72 while the opposite end portions 95, 97 of the connector 44 and spacer base portions 91, 93 are thick-walled to form the protrusions 46, 48 and spacers 62, 64, respectively, as shown in FIGS. 38, 39 and 40.

After the formation of the conductive layers 58, 60, a photo resist 126 (FIGS. 41 and 42) is applied by coating on the surface of the plate 72 on which the conductive layers 58, 60, and others are formed, and then exposed and developed so that end faces of the protrusions 46, 48 and spacers 62, 64 are covered by the photo resist 126.

Figure 41:
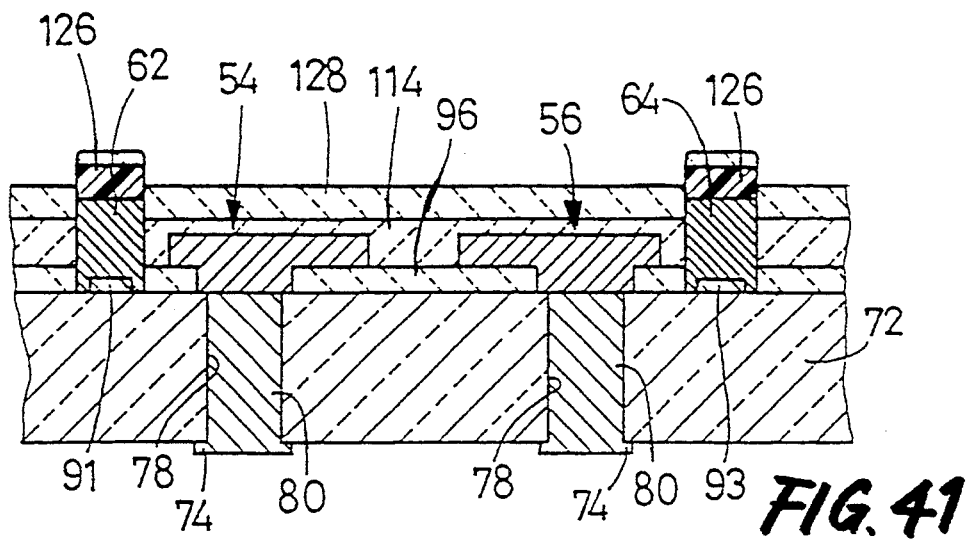
FIG. 41 is a cross sectional view corresponding to that of FIG. 38, explaining a sixteenth step for preparing the magnetic circuit board of FIG. 2.
Figure 42:
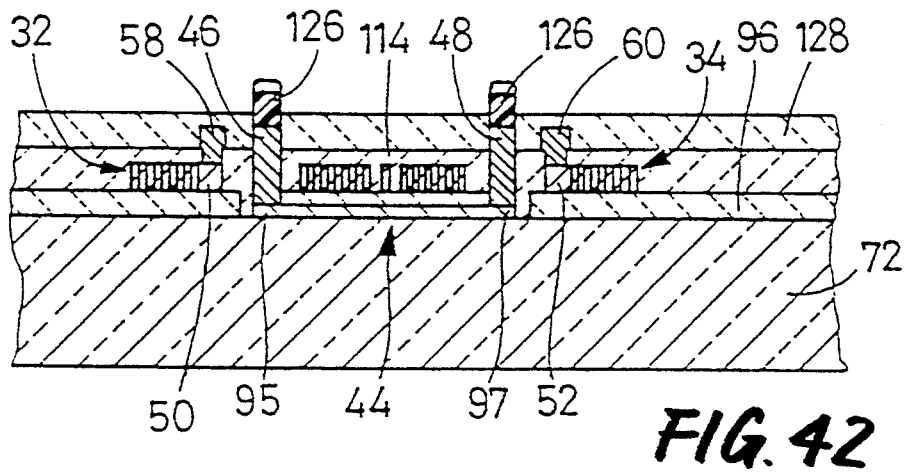
FIG. 42 is a cross sectional view corresponding to that of FIG. 39, explaining the above-indicated sixteenth step.

Subsequently, an insulating material such as $SiO_2$ or $Al_2O_3$ is applied by sputtering over the entire surface area of the plate 72 which carries the photo resist 126. Thus, an insulating layer 128 is formed so as to cover the conductive layers 58, 60, as shown in FIG. 41, 42. Then, the photo resist 126 is removed so that only the end faces of the protrusions 46, 48 and spacers 62, 64 are not covered by the insulating layer 128 but exposed to the outside.

Figure 43:
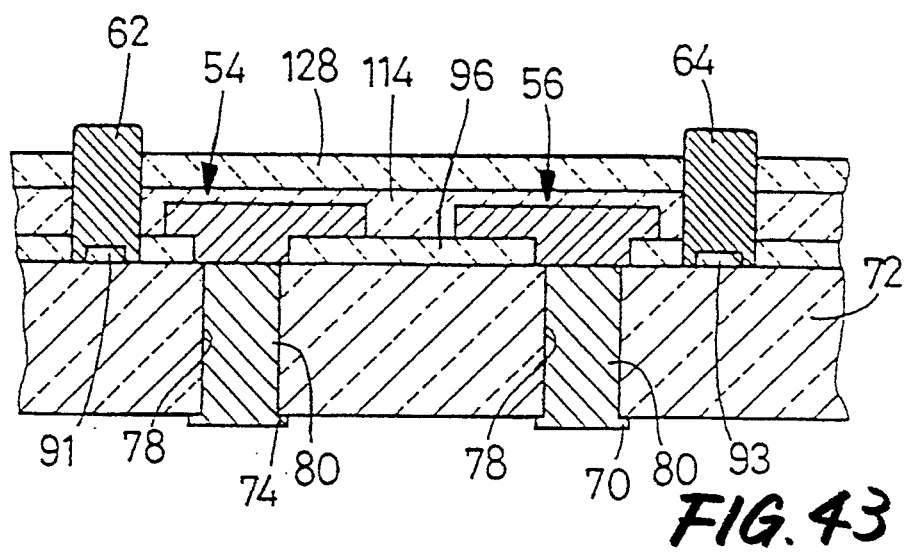
FIG. 43 is a cross sectional view explaining a seventeenth step for preparing the magnetic circuit board of FIG. 2, taken along line 43—43 of FIG. 45.
Figure 44:
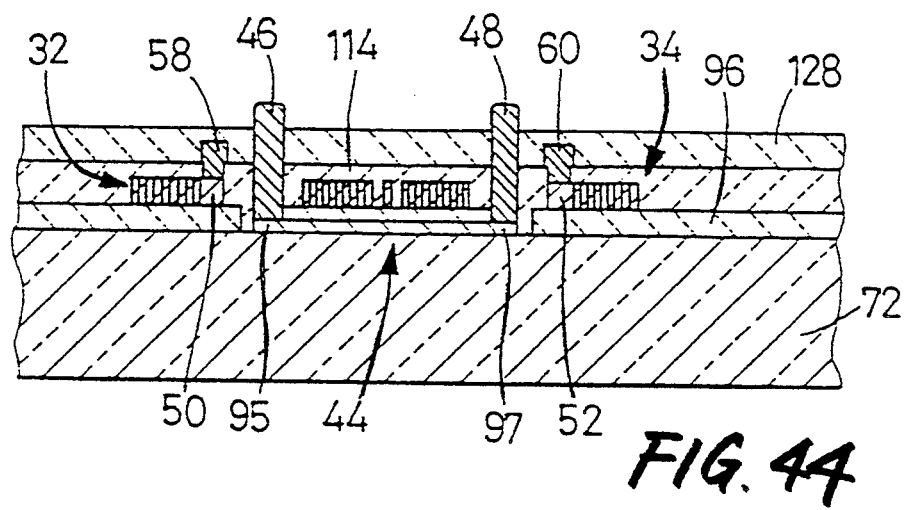
FIG. 44 is a cross sectional view explaining the seventeenth step indicated above, taken along line 44—44 of FIG. 45.
Figure 45:
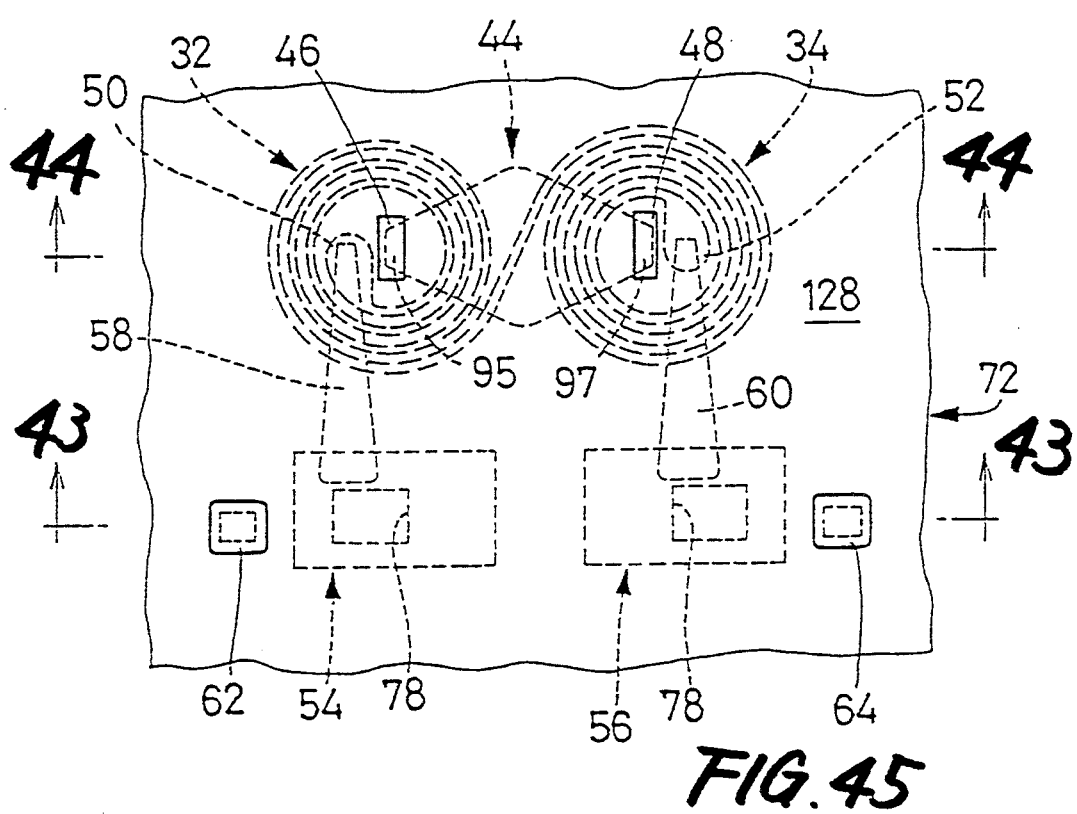
FIG. 45 is a plan view explaining the seventeenth step for preparing the magnetic circuit board of FIG. 2.
Figure 46:
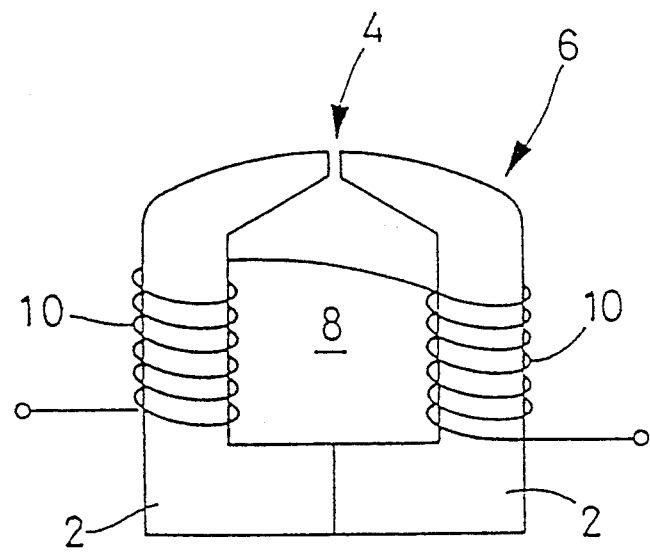
FIG. 46 is a view illustrating the conventional bulk-type magnetic head.
Figure 47:
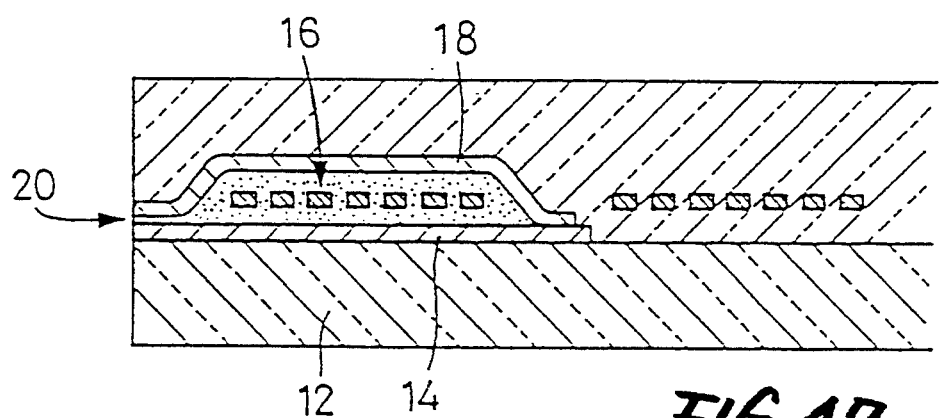
FIG. 47 is a cross sectional view showing the conventional thin-film type magnetic head.

Thereafter, a Ni-Fe magnetic material is applied by electroplating to the surface of the plate 72 on which the insulating layer 128 is formed, so that the protrusions 46, 48 and spacers 62, 64 protrude outwardly of the insulating layer 128 by a suitable distance, as shown in FIGS. 43, 44 and 45.

Figure 2:
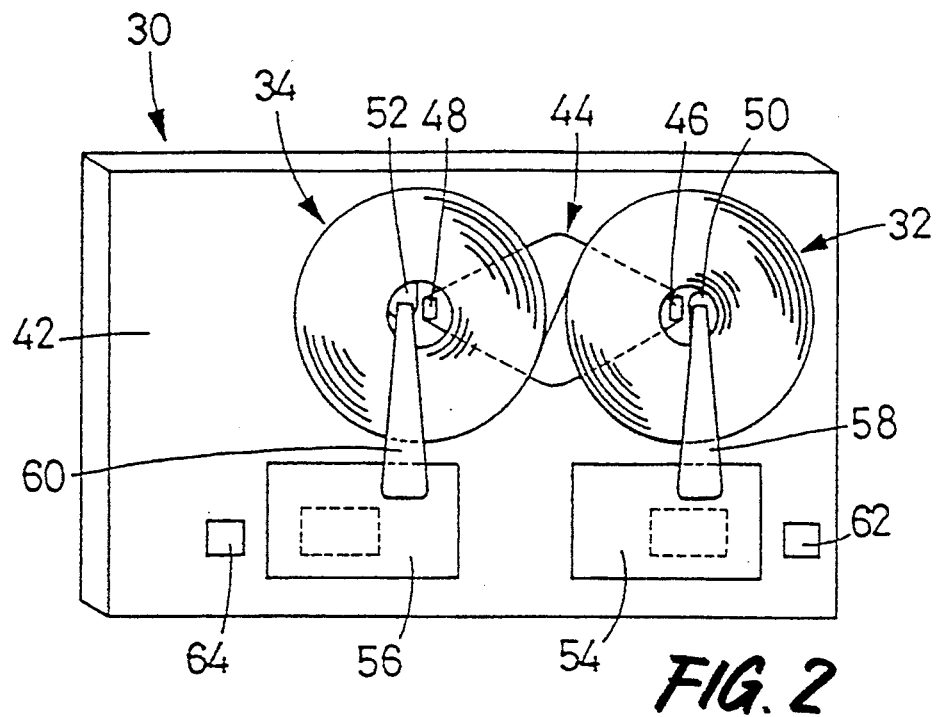
FIG. 2 is a perspective view showing a magnetic circuit board of the magnetic head of FIG. 1.

Finally, the plate 72 is cut into a plurality of units each having the coils 32, 34, connector 44, leads 54, 56 and others formed thereon, whereby the intended magnetic circuit board 30 as illustrated in FIG. 2 is obtained.

Apart from the formation of the magnetic circuit board 30, another process is effected for forming the core element 36 as illustrated in FIG. 3. According to a method of producing the conventional bulk-type magnetic head core, the core element 36 may be produced by: preparing two blocks formed of a magnetic material such as Ni-Zn ferrite, which give the first and second core substrates 66, 68; forming grooves for defining magnetic gaps in these ferrite blocks; bonding the blocks together by means of glass; cutting the bonded blocks into sliced sheets having a given thickness; and determining the width of magnetic gaps by machining, for example.

The thus obtained magnetic circuit board 30 and core element 36 are assembled together by using a suitable adhesive, or clamped by a suitable clamping member, whereby the desired magnetic head 40 as shown in FIG. 1 is obtained.

In the thus constructed magnetic head 40, the coils 32, 34 are formed integrally on the substrate 42 of the magnetic circuit board 30 by a thin-film forming method, without requiring a manual procedure of winding coils as needed for producing the conventional bulk-type magnetic head. Thus, the present magnetic head can be manufactured with high efficiency and high productivity, assuring a high degree of quality stability and a significantly reduced number of defectives.

In the instant magnetic head 40, a portion of the magnetic circuit is constituted by the first and second core substrates 66, 68 of the core element 36. Accordingly, the magnetic circuit exhibits a significantly reduced magnetic resistance, compared to the conventional thin-film type magnetic head, assuring excellent operating efficiency of the magnetic head.

In addition, the magnetic circuit is formed in the magnetic head 40 in the direction of thickness of the head 40. When the coils 32, 34 are located in the vicinity of the magnetic gap 36 as in the instant embodiment, therefore, the length of the magnetic path of the magnetic circuit can be effectively reduced, resulting in further improved operating efficiency of the magnetic head.

To produce the above-described magnetic head 40, the core element 36 having the magnetic gap 38 is formed separately from the magnetic circuit board 30. That is, the process of forming the magnetic gap is independent of the process of forming the coils and others. Therefore, the formation of the magnetic gap and the coils may be accomplished with further improved efficiency and productivity.

Further, the magnetic head 40 of the instant embodiment exhibits excellent electro-magnetic conversion characteristics, even with a relatively small space for the coils, since the coils 32, 34 are formed around the opposite protrusions 46, 48 of the connector 44, respectively.

In the instant embodiment, the spacers 62, 64 are both formed in the same film forming process as the opposite protrusions 46, 48 of the connector 44. It follows that the spacers 62, 64 and protrusions 46, 48 protrude the same distance from the substrate 42 of the magnetic circuit board 30. Upon assembling of the circuit board 30 with the core element 36, therefore, the magnetic connection of the protrusions 46, 48 to the core element 36 can be effectively and stably established.

While the present invention has been described in its preferred embodiment, for illustrative purpose only, the invention may be otherwise embodied.

While the coils 32, 34 are respectively formed around the opposite protrusions 46, 48 of the connector 44 in the illustrated embodiment, such a coil may be formed around only one of the protrusions.

Further, the shape of the coils or the manner of winding the coils is not limited to that of the illustrated embodiment, but may be changed as desired by employing a multilayer film forming technique or the like. For example, the coil may be formed in multilayer spiral configuration.

The materials of the first and second core substrates 66, 68 of the magnetic circuit, coils 32, 34, leads 54, 56, conductive layers 58, 60, insulating layers and others, and the manner of forming these components are not limited to those of the illustrated embodiment. For example, the coils 32, 34, magnetic film 82 and others may be formed by sputtering, for example, instead of electroplating. Further, a magnetic material used in the magnetic circuit board 30 of the present invention may be selected from Sendust containing Fe, Si and Al, an amorphous alloy (metal-metal) composed of Co, Zr and Nb, for example, or a metallic alloy (metal-metalloid) composed of Fe, Co, Si and B, for example, in addition to Permalloy containing Ni and Fe as used in the illustrated embodiment. Further, the insulating layer disposed between the connector and the coils may consist of an organic insulating film such as a photo resist, rather than an inorganic insulating film such as $SiO_2$ or $Al_2O_3$.

The connector 44 forming a part of the magnetic circuit may be made of a non-conductive magnetic material. In this case, an insulating layer need not be interposed between the connector 44 and the coils 32, 34. That is, the coils 32, 34 may be directly superposed on the connector 44.

In the illustrated embodiment, the leads 54, 56 are embedded in the magnetic circuit board 30 so as to extend over the entire thickness of the non-magnetic substrate 42. However, the leads 54, 56 may be formed on the surface of the substrate 42 on which the connector and coils are formed. In this case, the magnetic circuit board 30 protrudes upwards with respect to the core element 36 when the magnetic head 40 is mounted on the core slider 65 as shown in FIG. 4.

The location, number and material of the spacers 62, 64 are by no means limited to those of the illustrated embodiment. These spacers 62, 64 may be even eliminated as long as the opposite protrusions 46, 48 of the connector 44 are magnetically connected to the core element 36 without fail upon assembling of the magnetic circuit board 30 with the core element 36.

It is also to be understood that the present invention may be embodied with various other changes, modifications and improvements, which may occur to those skilled in the art, without departing from the spirit and scope of the invention defined in the appended claims.

What is claimed is:

1. A thin-film magnetic circuit board used in combination with a head core element including a first and a second magnetic substrate; and a magnetic gap formed by a non-magnetic layer interposed between the first and second substrates for bonding said first and second substrates to each other, said thin-film circuit board comprising:

a substrate formed of a non-magnetic material;
    a connector formed from a magnetic film on one of opposite major surfaces of said non-magnetic substrate, said connector having opposite end portions which protrude from one of the opposite major surfaces of said non-magnetic substrate to form a pair of protrusions; wherein, each of the protrusions contacts the corresponding magnetic substrate of the head core element to form a closed magnetic circuit defined by said connector and the magnetic substrates of the head core element;
    a coil formed from an electrically conductive film to provide a circuit pattern on said one major surface of said non-magnetic substrate, said coil having a spiral shape and surrounding said protrusions of said connector; and
    a pair of leads which are electrically connected to opposite ends of said circuit pattern formed by said coil.

2. A thin-film magnetic circuit board according to claim 1, wherein said coil consists of a pair of coils which are respectively formed around said pair of protrusions of said connector.

3. A thin-film magnetic circuit board according to claim 2, further comprising a pair of electrically conductive layers formed on said one major surface of said non-magnetic substrate, for electrically connecting said pair of leads to respective ends of said pair of coils as said opposite ends of said circuit pattern.

4. A thin-film magnetic circuit board according to claim 1, wherein said coil is at least partially superposed on said connector formed on said one major surface of said non-magnetic substrate.

5. A thin-film magnetic circuit board according to claim 4, further including an insulating layer interposed between said coil and said connector.

6. A thin-film magnetic circuit board according to claim 1, wherein said pair of leads are formed so as to extend over the entire thickness of said non-magnetic substrate to the other of opposite major surfaces of said non-magnetic substrate.

7. A thin-film magnetic circuit board according to claim 1, further comprising at least one spacer formed on said one major surface of said non-magnetic substrate to protrude from said one of the major surfaces of said non-magnetic substrate in the same direction as said protrusions, said at least one spacer and said protrusions having the same height.

8. A thin-film magnetic circuit board according to claim 1, wherein said non-magnetic substrate is formed of $Al_2O_3$ or $CaTiO_3$.

9. A thin-film magnetic circuit board according to claim 1, wherein said connector is formed of an alloy composed of Ni and Fe.

10. A thin-film magnetic circuit board according to claim 1, wherein said coil is formed of copper or a copper-base alloy including Cu-Al.

11. A magnetic head including a thin-film magnetic circuit board as defined in claim 1, and said head core element comprises: said first and said second substrates formed of a magnetic material; and said non-magnetic layer interposed between mutually facing surfaces of said first and second substrates, for bonding said first and second substrates to each other, said head core element having said magnetic gap formed between said mutually facing surfaces of said first and second substrates, said head core element being superposed on one of opposite major surfaces of said thin-film magnetic circuit board on which said coil is formed, so that said first and second substrates are magnetically connected to one and the other of said protrusions of said connector, respectively, whereby said first and second substrates cooperate with said connector to provide a single closed magnetic circuit including said magnetic gap.

12. A magnetic head according to claim 11, wherein said first and second substrates are formed of Ni-Zn ferrite.

13. A magnetic head according to claim 11, wherein said non-magnetic layer is formed of a glass material.

* * * * *